United States Patent
Elton et al.

(10) Patent No.: US 9,552,528 B1
(45) Date of Patent: Jan. 24, 2017

(54) METHOD AND APPARATUS FOR IMAGE BINARIZATION

(71) Applicant: ACCUSOFT CORPORATION, Tampa, FL (US)

(72) Inventors: John H Elton, Atlanta, GA (US); Stephen A Martucci, Kendall Park, NJ (US)

(73) Assignee: ACCUSOFT CORPORATION, Tampa, FL (US)

( * ) Notice: Subject to any disclaimer, the term of this patent is extended or adjusted under 35 U.S.C. 154(b) by 0 days.

(21) Appl. No.: 14/637,141

(22) Filed: Mar. 3, 2015

Related U.S. Application Data

(60) Provisional application No. 61/946,963, filed on Mar. 3, 2014.

(51) Int. Cl.
*G06K 9/38* (2006.01)
*G06T 7/00* (2006.01)

(52) U.S. Cl.
CPC .............. *G06K 9/38* (2013.01); *G06T 7/0085* (2013.01); *G06T 2207/20148* (2013.01)

(58) Field of Classification Search
None
See application file for complete search history.

(56) References Cited

U.S. PATENT DOCUMENTS

| 4,979,229 | A | 12/1990 | Moolenaar |
| 5,845,007 | A | 12/1998 | Ohashi et al. |
| 6,351,556 | B1 | 2/2002 | Loui et al. |
| 6,393,150 | B1 | 5/2002 | Lee et al. |
| 6,459,816 | B2 | 10/2002 | Matsuura et al. |
| 7,062,099 | B2 * | 6/2006 | Li .......................... G06K 9/38 358/521 |
| 7,783,117 | B2 | 8/2010 | Liu et al. |
| 8,068,684 | B2 | 11/2011 | Dauw et al. |
| 8,213,735 | B2 | 7/2012 | Cooksey et al. |
| 9,418,316 | B1 | 8/2016 | Liu et al. |

(Continued)

OTHER PUBLICATIONS

N. Otsu, "A Threshold Selection Method from Gray-Level Histograms", IEEE Transactions on Systems, Man, and Cybernetics, vol. SMC-9, No. 1, pp. 62-66, Jan. 1979.

(Continued)

*Primary Examiner* — Bernard Krasnic
(74) *Attorney, Agent, or Firm* — Straub & Pokotylo; Michael P. Straub; Ronald P. Straub

(57) ABSTRACT

Methods and apparatus for generating a binarization threshold are described. A set of input image pixels is processed. Edges including edge pixels are identified. In various embodiments histograms of pixel values and edge pixel values are generated and jointly used in determining an appropriate binarization threshold. In some embodiments a first histogram of edge pixel values is used to determine an interval of pixel values of interest to limit the set of pixel values used for determining a binarization threshold statistically. In some embodiments a first histogram corresponding to edge pixel values and a second histogram corresponding to image pixel values are generated, subjected to one or more smoothing operations, and truncated, based on information derived from the edge histogram. Characteristics of the histograms including, e.g., minima, maxima, are determined, evaluated, and used to generate a best global threshold.

17 Claims, 25 Drawing Sheets

(56) References Cited

U.S. PATENT DOCUMENTS

| | | | |
|---|---|---|---|
| 2003/0031366 A1* | 2/2003 | Li | G06K 9/38 382/206 |
| 2004/0032600 A1 | 2/2004 | Burns et al. | |
| 2010/0061629 A1* | 3/2010 | Ma | G06K 9/38 382/169 |
| 2010/0158373 A1* | 6/2010 | Li | G06K 9/38 382/172 |
| 2013/0044952 A1* | 2/2013 | Du | G06K 9/38 382/170 |
| 2013/0044953 A1* | 2/2013 | Du | H04N 1/403 382/170 |

OTHER PUBLICATIONS

R.M. Haralick, S.R. Sternberg, X. Zhuang, "Image Analysis Using Mathematical Morphology", IEEE Transactions on Pattern Analysis and Machine Intelligence, vol. PAMI-9, No. 4, pp. 532-550, Jul. 1987.

S.R. Sternberg, "Grayscale Morphology", Computer Vision, Graphics and Image Processing, vol. 35, No. 3, pp. 333-355, Sep. 1986.

A. Morales, R. Acharya, and S.J. Ko, "Morphological Pyramids with Alternating Sequential Filters", IEEE Transactions on Image Processing, vol. 4, No. 7, pp. 965-977, Jul. 1995.

J. Gil and R. Kimmel, "Efficient Dilation, Erosion, Opening, and Closing Algorithms", IEEE Transaction on Pattern Analysis and Machine Intelligence, vol. 24, No. 12, pp. 1606-1617, Dec. 2002.

J. Gil and M. Werman, "Computing 2-D Min, Median, and Max Filters", IEEE Transaction on Pattern Analysis and Machine Intelligence, vol. 15, No. 5 pp. 504-507, May 1993.

D.S. Bloomberg, "Multiresolution Morphological Approach to Document Image Analysis", ICDAR, pp. 1-12, 1991.

Y.M.Y. Hasan and L.J. Karam, "Morphological Text Extraction from Images", IEEE Transactions on Image Processing, vol. 9, No. 11, pp. 1978-1983, Nov. 2000.

M. Cumplido, P. Montolio, and A. Gasull, "Morphological Preprocessing and Binarization for OCR Systems", in Mathematical Morphology and Its Applications to Signal Processing, P.A. Margos, R.W. Schafer, and M.A. Butt, Eds., pp. 393-400, Springer, 1996.

I. Pitas, "Fast Algorithms for Running Ordering and Max/Min Calculation", IEEE Transactions on Circuits and Systems, vol. 36, No. 6, pp. 795-804, Jun. 1989.

E. Urbach and M. Wilkinson, "Efficient 2-D Grayscale Morphological Transformations With Arbitrary Flat Structuring Elements", IEEE Transactions on Image Processing, vol. 17, No. 1, pp. 1-8, Jan. 2008.

Zeng et al., "Point-wise extended visual masking for JPEG-2000 Image Compression", IEEE Proc. of Intl. Conference on Image Processing, vol. 1, pp. 657-660, (2000).

Taubman, "High Performance Scalable Image compression with Ebcot", Proceedings of the IEEE Intl. Conf. on Image Processing, vol. 3, pp. 344-348, 1999.

Watson et al., "Visibility of Wavelet Quantization Noise", IEEE Transactions on Image Processing, vol. 6, No. 8, pp. 1164-1175, Aug. 1997.

Mazzarri et al., "Perceptual Embedded Image Coding Using Wavelet Transforms", Proc. IEEE Intl. Conference Image Processing, vol. 1, pp. 586-589, 1995.

Hontsch et al., "APIC: Adaptive Perceptual Image Coding Based on Subband Decomposition with Locally Adaptive Perceptual Weighting", Proc. of Intl. Conf. on Image Proc. vol. 1, pp. 37-40, 1997.

Chou et al., "A Perceptually Tuned Subband Image Coder Based on the Measure of Just-Noticeable-Distortion Profile", IEEE Transactions on Circuits and Systems for Video Technology, vol. 5, No. 6, pp. 467-476. Dec. 1995.

Ferwerda et al., "A Model of visual Masking for Computer Graphics", Proc. SIGGRAPH '97, pp. 143-152, 1997.

Mallat, "A Theory for Multiresolution Signal Decomposition: The Wavelet Representation", IEEE Transactions on Pattern Analysis and Machine Intelligence, vol. 11, No. 7, pp. 674-693, Jul. 1989.

Sharifi et al., "Estimation of Shape Parameter for Generalized Gaussian Distributions in Subband Decompositions of Video", IEEE Transactions on Circuits and Systems for Video Technology, vol. 5, No. 1, pp. 52-56, Feb. 1995.

Wang et al., "Image Quality Assessment: From Error Visibility to Structural Similarity", IEEE Transactions on Image Processing, vol. 13, No. 4, pp. 600-612. Apr. 2004.

Wang et al., "Multi-Scale Structural Similarity for Image Quality Assessment", IEEE Asilomar Conference on Signals, Systems and Computers, pp. 1398-1402, 2003.

Grottke et al., "Apriori Rate Allocation in Wavelet-based Image Compression", Proc. of AXMEDIX 2006, pp. 329-336, 2006.

Wu et al., "Rate-Constrained Picture-Adaptive Quantization for JPEG Baseline Coders", ICASSP-93, vol. 5, pp. V-389-V392, 1993.

Taubman, "High Performance Scalable Image Compression with EBCOT", IEEE Transactions on Image Processing, vol. 9, No. 7, pp. 1158-1170, 2000.

Daly, "Application of a noise-adaptive contrast sensitivity function to image data compression", SPIEE, vol. 29, No. 8, pp. 977-987, Aug. 1990.

U.S. Appl. No. 14/637,222 titled "Methods and Apparatus Relating to Image Binarization" filed Mar. 3, 2015, pp. 1-72.

\* cited by examiner

Original grayscale image

Global binarization using computed Otsu threshold = 219

11000

Accusoft provides a full spectrum of document, content and imaging solutions. With its broad range of solutions, Accusoft is committed to deliver best-in-class, enterprise grade and fully-supported applications and a globally recognized suite of software development kits (SDKs). Accusoft products work reliably behind the scenes for capturing, processing, storing and viewing images, documents and more.

Global binarization using generated global threshold T = 150

FIGURE 11

Histogram of graylevels of edge pixels from half-scale image, not truncated

METHOD AND APPARATUS FOR IMAGE BINARIZATION

RELATED APPLICATIONS

The present application claims the benefit of U. S. Provisional Patent Application Ser. No. 61/946,963 filed on Mar. 3, 2014 which is hereby expressly incorporated by reference in its entirety.

FIELD

Various embodiments relate to image processing, and more particularly to image binarization.

BACKGROUND

Image binarization refers to the process of converting an image represented by pixel values which may assume multiple levels to pixel values which can be one of two values, e.g., a first value corresponding to foreground and a second value corresponding to background. Image binarization can be used to convert a grayscale or a color image to a black and white image. Frequently, binarization is used as the preprocessing step of document image processing. For example, barcodes are typically captured as grayscale or color images that may require binarization as a first step before processing to decode the barcode to ascertain its value. Similarly, optical character recognition (OCR) algorithms may require binarization as a first step.

One approach to performing image binarization is to choose a single threshold value and classify each of the pixels of the image with values above this threshold as white and each of the other pixels as black. This can be much faster than a locally adaptive binarization method and therefore a good choice when speed is a major consideration. Such a method works well for many images, particularly when the distribution of pixel values has distinct characteristics.

A still unsolved problem is to determine the best global threshold value to use. There are known methods, such as the clustering method due to Otsu for example, for computing a global threshold by using statistics of the distribution of pixel values that work reasonably well but they do not always choose the best value. There remains a need for a better way to find the best global threshold value for a particular image.

Another unsolved problem is to reliably recognize whether or not an image is a good candidate for global binarization instead of locally adaptive binarization where the image must be processed pixel-by-pixel and a threshold specifically computed for each pixel. There remains a need for a better way to make that choice.

BRIEF DESCRIPTION OF THE FIGURES

FIG. 11 is an well-binarized output image produced from processing the input image of FIG. 9, in which the processing used binarization resulting from globally thresholding, in accordance with the methods of the present invention, which generated a global threshold value=150.

SUMMARY

Figure 1:
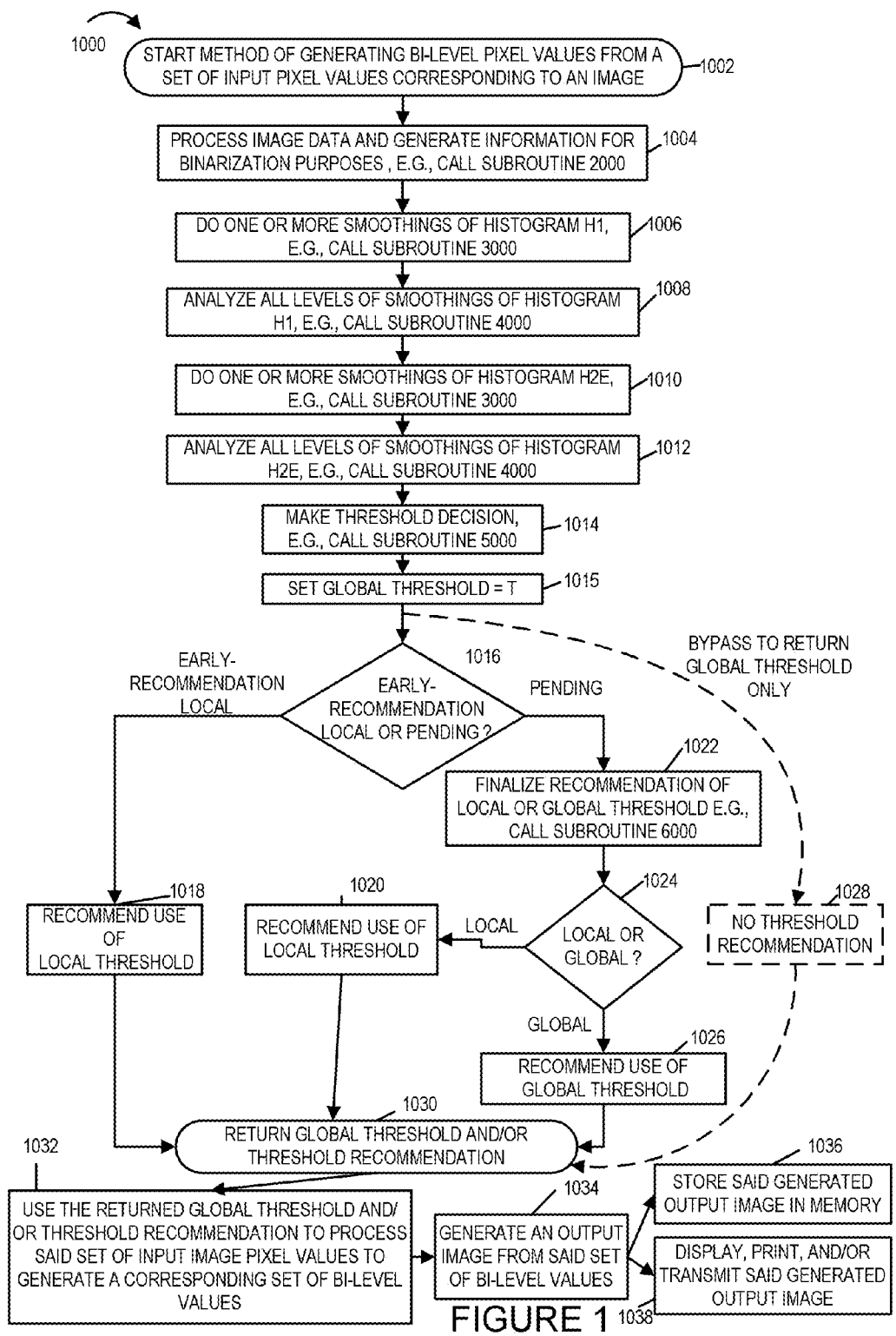
FIG. 1 is a flowchart of an exemplary method of generating bi-level pixel values from a set of input values corresponding to an image.

Various new and improved methods use both the graylevel histogram of pixel values (as Otsu algorithm uses) and the graylevel histogram of only those pixel values that are classified as edge, or high-contrast, pixels to determine what is the best global threshold value for binarization and to decide whether or not a single global threshold will yield a binarization that is preferred over that obtained from using a locally determined threshold. The binarization task is discussed in terms of finding and applying a global threshold to a full-size image; however, the described methods can be, and in some embodiments are, used on one or more subimages of a full-size image if necessary or desired, where those subimages are determined from a full-size image.

A weakness in the Otsu algorithm is that the value of the computed threshold is influenced by all of the pixel values, including possibly a very large number of background pixels in regions that have no edges and therefore no information to be extracted by binarization. These pixels can cause the Otsu threshold to be moved far away from a threshold that would allow distinguishing the real information defined by the edges in the image. An exemplary method, in accordance with some embodiments of the present invention, uses a histogram of the graylevels of only the edge pixels to restrict attention to the graylevels of the image pixels that are the ones that convey meaningful information in the image and disregards the others. In this way, a focus can be placed on separating the background from the foreground where the meaningful content lies.

A fast method for classifying pixels as edge pixels is to use a method in Lu, Su et al, that computes a contrast strength for each pixel. Then, all of the computed contrast strengths are collected and separated into two groups using a statistically based clustering algorithm such as, e.g., the Otsu algorithm. Pixels with contrast strength below the threshold are classified as non-edge, or non-contrast, pixels; pixels with contrast above the threshold are edge, or contrast, pixels, so named because they are at or near the object edges, or high contrast transitions, in the image. The histogram of only these edge pixel values conveys information not seen in the histogram of all pixel values.

Then, from the edge pixels histogram the lower and upper truncation points, defined as those graylevel values where a predetermined percentage of all pixels in the histogram lie either below or above those points, respectively, are found. These points are used to define an interval of interest for the graylevels in the image histogram or edge pixels histogram as being between those lower and upper truncation points. By doing this histogram truncation, the adverse influence of extreme dark and light pixels on the pixel statistics and on the shape and size of the histograms can be excluded, and this approach leads to finding a better global threshold and making a better decision about whether to use global or local binarization than could be made by looking at only the full histogram of all image pixel values.

One immediate consequence of a truncated image pixel histogram is a better statistically based global threshold than would be computed from the histogram of all pixel values. If the Otsu algorithm is applied to the image pixels histogram truncated to the interval between lower and upper truncation points found from an analysis of the histogram of edge pixel values, a better global threshold can be obtained than would be found from the Otsu algorithm using the unmodified image pixel histogram. This new modified-Otsu threshold is a first better global threshold computation and is the fallback threshold to use if the further novel methods cannot find a better threshold.

The exemplary method then attempts to find a single global threshold value that even better separates background from foreground in an image than the purely statistical second-moment approach of the Otsu threshold or this new modified-Otsu threshold. If the image's gray level values include two predominant graylevel centers of interest, one characteristic of the background and one characteristic of the foreground, and the foreground is in fact separable from the background by a single threshold value, a threshold can be more precisely located by looking at the shape of the histogram itself than by the purely statistical method of Otsu. Shape-analysis approaches are known in the field, but never before has one been combined with using extra information derived from the edge pixels in the image. In accordance with a feature of some embodiments of the present invention, a threshold is determined using a shape analysis approach combined with extra information derived from edge pixels in the image.

Furthermore, not just the histogram of the image pixel graylevels is examined and used to determine a threshold, but successive smoothings of the histogram of the graylevels of all image pixels and successive smoothings of the histogram of the graylevels of just the edge pixels are performed and used to determine a threshold. The original and smoothed histograms in their entirety or restricted to only an interval of interest, are examined and analyzed to gather parameters used in a novel method to locate a best separation point. In many cases, by looking at a smoothed histogram, it is possible to better find a minimum point between the two maxima representing the foreground and background centers than is possible by looking only at the original histogram. Often, the unsmoothed histogram is too noisy or erratic to allow locating a meaningful minimum; the smoothing removes the noise but retains the general characteristics of the distribution of pixel graylevels. Finally, in those cases where the two maxima are far apart, and the histogram is low and flat between them thus making determination of a unique best threshold difficult, operations are used other than just locating a minimum point to determine the best threshold.

The successive smoothings of the histograms are also used to decide if global thresholding is likely to work well. One goal is to choose global thresholding when possible because of its much greater speed than local thresholding methods, but it is also important that the global instead of local binarization does not have an adverse effect on the next stages of processing that the binarized image will be used for, so it is important to make a good decision about this. Other approaches to binarization have made the decision that global thresholding can be used, using the Otsu threshold for example, if the histogram can be classified as bimodal. However, making the decision that global thresholding can be used if the histogram can be classified as bimodal is not quite correct in two ways. One problem is that even if the histogram is bimodal, the background peak might contain so many pixels, from pixels that do not even represent any edges, that the Otsu threshold is much too close to the background level and the binarization is not successful. In the other direction, there may be other peaks that make the classification of the full histogram not bimodal, but those other peaks are outside of the interval of graylevels where information (edges) occur, so that the image can nevertheless be successfully globally binarized. Various methods, in accordance with some embodiments, the present invention, including looking at histograms of only edge pixels and truncating the interval of graylevels considered in the histograms help solve these problems. Then, the zero-crossings of the first and second derivatives of the successively smoothed histograms are used both to decide if the image can likely be successfully globally binarized and to locate a threshold for that.

The successively smoothed histograms create what is known as a scale-space representation. This type of successive smoothing is beneficial to the task of analyzing a histogram looking for extrema or inflection points. If the true histogram includes a mixture of Gaussians, then the successive smoothings done using this approach have the property that a zero-crossing of the first derivative that disappears when the successive smoothing has just removed a maximum point, or a zero-crossing of the second derivative that disappears when the successive smoothing has just removed an inflection point, will not reappear at further smoothings, so a consistent picture of the number of humps, valleys, and inflection points at successive levels can be obtained.

After computing the histograms, finding truncation points, and smoothing the histograms, operation proceeds to making a threshold decision and validating it by analyzing the scale-space representations of the truncated image histogram and of the truncated edge pixels histogram. If a satisfactory global threshold exists, the exemplary method may be expected to find the satisfactory global threshold at a low point in the histogram that clearly separates the foreground pixels from the background pixels. In the case that the background is bright and the foreground is dark, the background pixels show up in the histogram to the right of this point and the foreground pixels to the left. Pixels outside of the truncation interval are ignored because there may be a very large number of background pixels at some graylevels outside this interval that do not contain any information because they are not involved in creating edges.

Now in trying to find meaningful minimum points in the histogram, one can be hampered by the fact that the original unsmoothed histogram typically has a very large number of small humps and consequently a very large number of insignificant minimum and maximum points. An exemplary method, in accordance with some embodiments of the present invention, for dealing with this is to look at the successively smoothed histograms until a persistent small number of minimum points is identified, indicating that a meaningful representation of the real shape of the histogram has been reached. An exemplary method, in accordance with some embodiments further includes looking at the inflection points (the zeroes of the second derivative) from this smoothing level on, to see if there are persistent "hidden" humps between the proposed minimum point and the nearest maximum points on either side that could indicate possible information that would not be detected using this minimum point as a global threshold.

If two or fewer minimum points between the truncation points are never obtained, or if there are no minimum points between the truncation points, the global threshold is set to the statistically based modified-Otsu threshold, for example, and it is recommended to use local binarization for that image. Next, if the most persistent number of minima within the interval is two for the smoothed image histograms, the percentage of edge pixels with graylevel above the second minimum (call this the edge upper tail percentage) is looked at, as well as looking at the percentage (relative to the total pixels within the interval) of image pixels with graylevel above the second minimum (call this the upper tail percentage). If either of those is not small (for example, if either is greater than 10 percent) local binarization is recommended and the global threshold is set to the statistically based modified-Otsu, for example. If both of those are small, then the percentage of pixels up to the first minimum is checked, and it is checked that the percentage of pixels between the first and second minimum are large (for example twice as big) compared to the upper tail percentage, and similarly for the edge upper tail percentage. In addition it is checked that the second minimum is above the maximum point which is to the right of the minimum of the edge pixel's histogram if it had one minimum as most persistent, and to the right of the first minimum in case the edge pixel's histogram had two minima as most persistent. If all those conditions are met, then both histograms are considered to have effectively only one minimum, and the upper one is ignored (that is, throw out consideration of the upper tail). For an image for which the background is known to be the brighter graylevels and the foreground the darker ones, a check for a small left tail is not performed; otherwise, the same check can be made, and in some embodiments is made, for the lower tail in the case of two minima within the interval.

Similarly, if the most persistent number of minima on the smoothed graylevel histograms of edge pixels is two while the most persistent number of minima on the smoothed regular histograms is one, a similar test is performed to determine if the upper tail of the edge pixels histogram can be ignored, and the edge pixel graylevel histogram can be treated as effectively having one minimum also; if not, local binarization is recommended and global threshold is set to the statistically based modified-Otsu, for example.

At this point, a truncated histogram of graylevels has been found to effectively have one minimum for the most persistent number of smoothings, starting at a certain level, and effectively only one minimum point for the histogram of the graylevels of edge pixels exists, starting at some level. This yields a global threshold as the zero-crossing of the first derivative at the first level where there was only one zero crossing at a minimum within the truncation points.

A sanity check for the single minimum point in the truncated histogram as a potential binarization threshold is performed. If that point is not between the maximum point to the immediate left of the single minimum on the graylevel histogram of the edge pixels where the run of single minimums started, and the maximum point to the immediate right, then that minimum is rejected as a plausible threshold (the threshold should certainly be between the peaks on the essentially bimodal histogram of the edge pixels graylevels), and the global threshold is set to the statistically based modified-Otsu, for example, and it is recommended to use local binarization for that image.

Continuing, a check is performed to confirm effectively a bimodal image within the interval of interest by checking the number of zero-crossings of the second derivative for the scale levels starting with the first one having only one minimum in the interval (and the level where the location of that minimum is a tentative threshold for binarization). If two Gaussian-like humps are close together, and their sum is considered to be their contribution to the histogram, the histogram may fail to have two maxima corresponding to these Gaussian humps. So between the minimum point and the maximum point to the right of it, one may fail to see the presence of another Gaussian contributing to the histogram if only looking for zeroes of the first derivative. But having three (or more) inflection points between the minimum point and the maximum to the right of it, rather than just one, signals that there were two or more Gaussians contributing to the histogram to the right of the minimum point, and possibly it is not a good candidate for global binarization: it is not known if the pixels in that "hidden" hump should be in the foreground or the background, without further, local, information. On the other hand, more than one zero-crossing of the second derivative between the minimum and the maximum just to the right, if it does not persist over many scales, might well just be noise or insignificant.

So an exemplary method in accordance with some embodiments of the present invention includes counting the number of scales, after the scale where the single minimum first occurred, that there is more than one inflection point between the minimum and the next maximum to the right, at that scale. If that number of scales is comparable to the number of scales that continue to show the single minimum point (for example, exceeds ¾ of the number of scales that have the single minimum), it is considered to be persistent and indicative of non-bimodality, and local binarization is recommended. The same test is made for zero crossings of the second derivatives between the single minimum and the maximum located to the left of it.

A similar test for persistence of more than one inflection point (zero-crossing of the second derivative) in the smoothed levels of the histogram of the graylevels of edge pixels is performed, between the single minimum and the maximum point just to the right of it, as well as to the left. If more than one inflection point persists, local binarization is recommended.

Finally, a few checks of the characteristics of the histogram of the edge pixel graylevels that are somewhat dependent on the method of classifying edge pixels are performed. If the document represented by the graylevel image had a single color for foreground and a single color for background, then along edges where background meets foreground, one would find typically all graylevels between the background color and the foreground color, because the edges are distributed in random ways along pixel boundaries in the quantization process. But the color of the background and the color of the foreground occur more frequently than the in-between colors, by as much as a factor of two, because at a vertical edge, for example, that is in the middle of a pixel, the pixel to the left and the pixel to the right are classified as edge pixels as well as the pixel at the edge; but for a vertical edge that is on the pixel boundary, only the foreground and background colors get classified as edge pixels. Empirically, it is indeed found that there are peaks in the histogram of edge pixel graylevels at the places representing the foreground representative color and at the background representative color, with the peak being as much as twice as high as the in-between values. For blurred images, the peak is less pronounced, but still present.

So the characteristics of the edge graylevel histogram at the scale where it first had a single minimum point can be, and in some embodiments is, checked, to see if it supports the conclusion of essentially a single foreground and single background representative color consistent with these ideas. It can be, and in some embodiments is, checked that the percentage of edge pixel graylevels between the two peaks is not less than some percentage to the left, or some percentage to the right, of the peaks. It can be, and in some embodiments is, checked that the percentage of edge pixel graylevels between the minimum and the left peak is at least some substantial percentage (for example 10 percent) of the percentage between the minimum and the right peak, and the same check in the other direction. It can be, and in some embodiments is, checked that the maximum point to the right of the minimum point for the edge pixel graylevel histogram is not too far from the maximum point to the right of the minimum point on the ordinary graylevel histogram (for example, not more than half the distance between the minimum point and the maximum point to the right of it on the ordinary histogram), and similarly for the maximum point to the left of the minimum point on the edge pixel graylevel histogram. Then it can be, and in some embodiments is, checked that the height of the peak to the left of the minimum point on the edge pixel graylevel histogram is at least some percentage (for example 10 percent) of the height of the peak to the right, and similarly in the reverse direction. Finally, it can be, and in some embodiments is, checked that the height at each peak exceeds the height at the dip by some percentage (for example 10 percent); this last check is based on the characteristics of the edge pixels mentioned above. If any of these sanity checks fail, local binarization is recommended. Otherwise, it is recommended to use a global threshold.

An exemplary image binarization method, in accordance with some embodiments, includes identifying edges in an image, said edges including edge pixel values; generating a histogram of edge pixel values corresponding to the identified edges; and generating, based on the histogram of edge pixel values, a binarization threshold.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

FIG. 1 is a flowchart 1000 of an exemplary method of generating bi-level pixel values from a set of input values corresponding to an image. Operation of the exemplary method starts in step 1002 and proceeds to step 1004. In step 1004 image data is processed and used to generate information for binarization purposes. The various values and information, e.g., one or more histograms, generated in step 1004 is information that is useful in later processing steps which will be described below. In some embodiments, step 1004 includes a call to subroutine 2000. Operation proceeds from step 1004 to step 1006. In step 1006 one or more smoothings of image histogram H1 are performed. In some embodiments, step 1006 includes a call to subroutine 3000. Operation proceeds from step 1006 to step 1008.

In step 1008 all levels of the smoothings of the image histogram H1 that were computed in step 1006 are analyzed. In some embodiments, step 1008 includes a call to subroutine 4000. Operation proceeds from step 1008 to step 1010. In step 1010 one or more smoothings of the edge pixels histogram H2E are performed. In some embodiments, step 1010 includes a call to subroutine 3000. Operation proceeds from step 1010 to step 1012. In step 1012 all levels of the smoothings of the edge pixels histogram H2E that were computed in step 1010 are analyzed. In some embodiments, step 1012 includes a call to subroutine 4000. Operation proceeds from step 1012 to step 1014.

In step 1014 a threshold decision is made. In step 1014, the information generated from the histograms and their smoothings is used to find the best global threshold value and to make a preliminary recommendation of local or global binarization. In some embodiments, step 1014 includes a call to subroutine 5000. Operation proceeds from step 1014 to step 1015.

In step 1015 the threshold T determined in step 1014 is assigned to be the global threshold value to use to binarize the image if the method is being used to find the best global threshold. If the method is only looking for a global threshold and not a recommendation for using local vs. global, then processing progresses through step 1028 to return in step 1030 the global threshold found in step 1014 and assigned in step 1015. Otherwise, processing progresses from step 1015 through one or more of steps 1016, 1018, 1022, 1024, 1020, and 1026 to return in step 1030 the global threshold found in step 1014 and assigned in step 1015 and/or a recommendation of using local or global thresholding.

If the method is going to return a recommendation of using local or global thresholding with or without also returning the best global threshold, the status returned from subroutine 5000 is examined, in step 1016, to see if an early-recommendation decision to recommend local binarization is able to be made. If an early recommendation to use local binarization is made, operation proceeds from step 1016 to step 1018, in which the recommendation to use local thresholding is made. If not, then the pending recommendation is global thresholding but that recommendation should be finalized with some additional optional checks, and operation proceeds from step 1016 to step 1022. Step 1022 performs further checking and then makes the final recommendation of local or global thresholding. In some embodiments, step 1022 includes a call to subroutine 6000.

Operation proceeds from step 1022 to step 1024. The returned recommendation is evaluated in step 1024 and the path through step 1020 is taken if local thresholding is recommended and the path through step 1026 is taken if global thresholding is recommended. Operation proceeds from step 1020 or step 1026 to step 1030, which returns a global threshold and/or a threshold recommendation.

Operation proceeds from step 1030 to step 1032, in which the returned global threshold and/or threshold recommendation is used to process said set of input image pixel values to generate a corresponding set of bi-level values. The input image pixel values are in some embodiments values generated by scanning a document which is intended to be subject to an optical character recognition operation. Operation proceeds from step 1032 to step 1034 in which an output image is generated from the generated set of bi-level values. Operation proceeds from step 1034 to step 1036 and 1038. In step 1036 the generated bi-level, e.g., black and white, output image is stored in memory. The bi-level image is then subject to further processing, e.g., an optical character recognition and subsequent text recognition operation in some embodiments. In step 1038 the generated output image is displayed, printed and/or transmitted. The results of the text recognition operation may be, and in some embodiments is, output and/or transmitted with the binarized image.

Figure 2:
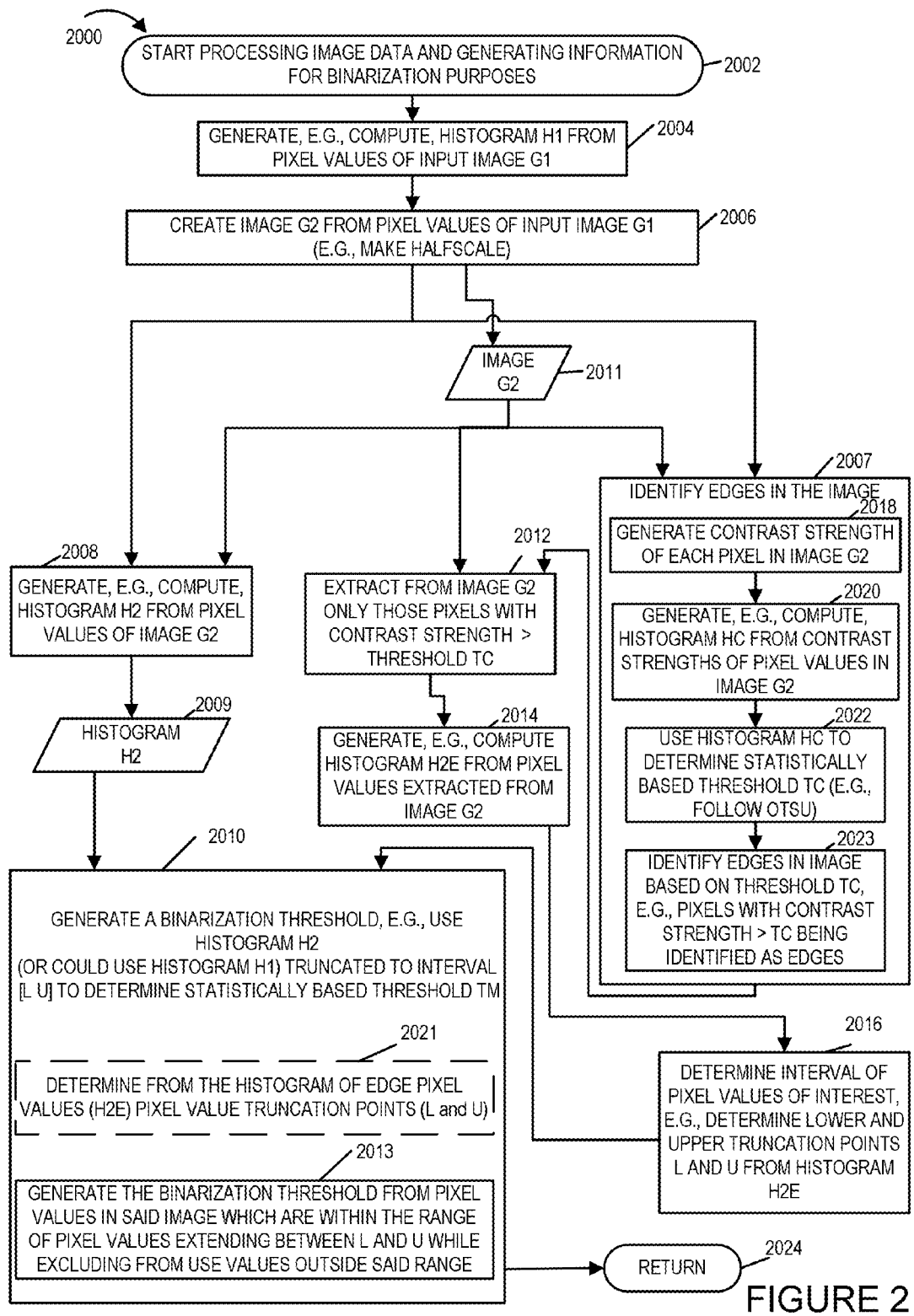
FIG. 2 is a flowchart of an exemplary subroutine of an exemplary method of processing image data and generating information for binarization purposes.

FIG. 2 is a flowchart of an exemplary subroutine 2000 of an exemplary method of processing image data and generating information for binarization purposes. Histogram H1 of the graylevels of all pixels of the image G1 and the histogram of the graylevels of only those pixels classified as edge, or contrast, pixels are computed. A fast method for classifying pixels as edge pixels is to use a method that computes a contrast strength for each pixel in the image as the maximum pixel value minus the minimum pixel value found within the 3×3 window centered at each image pixel. Then, all of the computed contrast strengths are collected and separated into two groups using a statistically based clustering algorithm such as the Otsu algorithm. A threshold is determined and that threshold is used to separate all image pixels into two groups according to each pixel's computed contrast strength. Pixels with contrast strength below the threshold are classified as non-edge, or non-contrast, pixels; pixels with contrast above the threshold are edge, or contrast, pixels, so named because they are at or near the object edges, or high contrast transitions, in the image.

For greater speed and to reduce the influence of noise and irregularities when computing the pixel contrast strengths, first smooth and downsample the full-size image and then compute the contrast strengths for this reduced-size image. A good choice, but not the only choice, is to reduce the image size by a factor of two in each dimension to generate a half-scale image. An exemplary fast way to do this is to average every four pixels down to one, which is equivalent to smoothing by a box filter, and then downsampling. Although the half-scale image has fewer pixels than the original, the distribution of its pixel graylevel values and the computation and distribution of the pixel contrast strengths will retain the same characteristics as those of the full-size image, and therefore complexity can be significantly reduced by operating on a smaller image. Note that this invention does not preclude using the full-size image or a further reduced-size image to compute the contrast strengths and use that to classify the pixels if conditions so warrant.

From a histogram of the contrast strengths, use a method such as the Otsu method, for example, to find a cutoff contrast strength to classify an image pixel as an edge pixel or not. Next make a histogram of the graylevels of only those pixels classified as edge, or contrast, pixels. From that histogram find lower and upper truncation points defined as those graylevel values where a predetermined percentage of all pixels in the histogram lie either below or above those points, respectively. Then an interval of interest for the graylevels in the histogram is defined as being between those lower and upper truncation points. Exemplary percentiles for determining lower and upper truncation points are 2.5% and 97.5%, respectively, and thus 95% of the pixels of interest are captured between those bounds.

Next compute the histogram of the graylevels of the pixels of the half-scale image or, alternatively, use the histogram of the full-size image, truncate that histogram according to the lower and upper truncation points found above, and then use a statistically based algorithm such as the Otsu algorithm, for example, on the truncated histogram to determine threshold TM. The threshold TM is an improvement over the Otsu algorithm because it removes one of the flaws of the regular Otsu threshold being possibly overly influenced by pixels outside of the interval of interest. A good example of such an image is one with large bright margins surrounding a small region of interest. At this point, the generated threshold TM is the best global threshold to return until, and if, the further steps of processing generate a better one.

FIG. 2 is a flowchart of an exemplary subroutine 2000 of an exemplary method of processing image data and generating information for binarization purposes in accordance with an exemplary embodiment.

Operation starts in step 2002 and proceeds to step 2004. In step 2004 a histogram H1 is generated, e.g., computed, from pixel values of input image G1. Operation proceeds from step 2004 to step 2006. In step 2006 image G2 2011 is created from pixel values of input image G1. In some embodiments step 2006 creates a half-scale image. The half-scale image is generated, e.g., by filtering and then downsampling by two in both the horizontal and vertical dimensions. The downsampling is performed to reduce the amount of data and computational complexity associated with subsequent operations. It should be appreciated that downsampling by amounts other than 2 can be performed and/or downsampling may be avoided with subsequent processing being performed on the data corresponding to a full resolution image. Thus, while downsampling reduces computational requirements and allows for the binarization to be performed using lower computational capacity and/or in less time than would be required if processing was performed on the full resolution image data, the downsampling and use of a half-scale or other reduced scale image is not critical or necessary to the invention but may be desirable in embodiments where for cost or other reasons computational capacity and/or the time for performing computations is limited or to be reduced for convenience or other reasons as compared to the amount of time which would be required if a full resolution image was used for computing various values, histograms, or thresholds. Operation proceeds from step 2006 to steps 2007 and 2008.

In step 2007 the edges in the image are identified. Step 2007 includes steps 2018, 2020, 2022, and 2023. In step 2018 the contrast strength of each pixel in image G2 is generated. Operation proceeds from step 2018 to step 2020. In step 2020 a histogram HC is generated, e.g., computed, from contrast strengths of pixel values in image G2. Operation proceeds from step 2020 to step 2022. In step 2022 the histogram HC is used to determine a statistically based threshold TC, e.g., following OTSU. Operation proceeds from step 2022 to step 2023. In step 2023, edges in the image are identified based on threshold TC, e.g., pixels with contrast strength > TC are identified as edges. Operation proceeds from step 2007 to step 2012.

Returning to step 2008, in step 2008 a histogram H2 2009 is generated, e.g., computed, from pixel values of the image G2 2011.

Returning to step 2012, in step 2012 only those pixels with contrast strength greater than threshold TC are extracted from image G2. Operation proceeds from step 2012 to step 2014. In step 2014, histogram H2E is generated, e.g., computed, from pixel values extracted from image G2. Operation proceeds from step 2014 to step 2016. In step 2016 an interval of pixel values of interest is determined, e.g., lower and upper truncation points, L and U, are determined from histogram H2E. Operation proceeds from step 2016 to step 2010.

In step 2010 a binarization threshold is generated, e.g., histogram H2 truncated to interval [L U] or histogram H1 truncated to interval [L U] is used to determine statistically based threshold TM. In some embodiments step 2010 includes step 2021 in which a range is determined from the histogram of edge pixel values (H2E) with the range being defined by pixel value truncation points L and U which are determined in step 2021. The processing shown in step 2021 is the same or similar to the processing in step 2016. Thus if the processing is performed in step 2016, it need not be repeated in step 2021 and in such a case step 2016 should be considered as part of determining a binarization threshold. In one such embodiment, step 2010 also includes step 2013 in which the binarization threshold is generated from pixel values in the image which are within the range of pixel values extending between L and U while pixel values outside the range are excluded from use in generating the binarization threshold. In some embodiments, determining the statistically based binarization threshold TM includes using an OTSU method.

Operation proceeds from step 2024, in which subroutine 2000 returns generated useful information, e.g., histogram H1, histogram H2E, lower and upper truncation points, a binarization threshold, etc., to the routine which called subroutine 2000.

Figure 3:
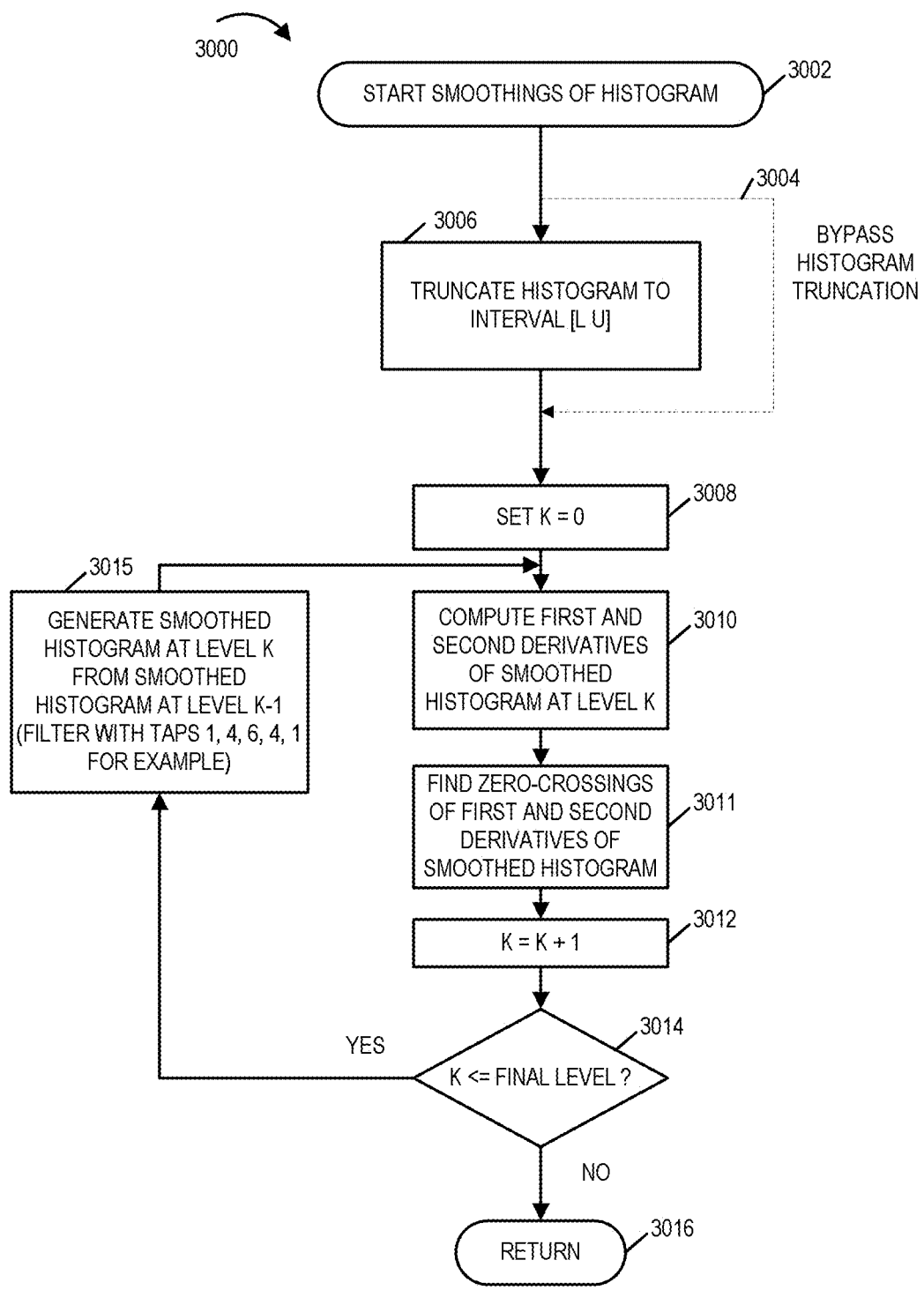
FIG. 3 is a flowchart of an exemplary subroutine of an exemplary method of smoothing a histogram.

FIG. 3 is a flowchart of an exemplary subroutine 3000 of an exemplary method of smoothing a histogram. In subroutine 3000 of FIG. 3, one or more smoothings of a histogram are performed in step 3015, first and second derivatives of the original and smoothed histograms are computed in step 3010, and the zero-crossings of those derivatives are found in step 3011. Because the smoothed histograms within the interval between the lower and upper truncation points will be analyzed, truncation can be applied here in step 3006 and the smoothings can be performed on the truncated histograms in step 3015. Alternatively, step 3006 can be bypassed and the full histograms can be smoothed in step 3015 and the truncation can be performed in the analysis only. The zero-crossings of the first derivative occur at the local maxima and minima of the histogram function. The zero-crossings of the second derivative occur at the inflection points of the histogram function. The method which includes successive smoothings of a histogram, both the edge pixels histogram and the image histogram, uses recursive binomial filtering of the histograms, which is very fast and produces close to a Gaussian filtering of the histograms. At each level of smoothing, a filtering operation generates a smoothed value for each histogram value of the previous level as a weighted combination of the histogram values in its neighborhood at that previous level using weights applied to those histogram values with the center weight aligned with the particular histogram value being smoothed. Typically such a filter can be, and in some embodiments is, used with relative weights 1, 4, 6, 4, 1 on each successive smoothing. This gives approximately a sequence of Gaussian smoothings in which the variance of the Gaussian grows by ½ on each step. In one exemplary embodiment, 256 successive smoothings are carried out this way, but that is only a particular embodiment and more or less smoothings could be used if appropriate.

Operation starts in step 3002. In some embodiments, operation proceeds from start step 3002 to step 3006, in which the histogram H1 being processed is truncated to interval [L U]; and operation proceeds from step 3006 to step 3008. In some other embodiments, operation proceeds from start step 3002, via path 3004, which bypasses the histogram truncation, to step 3008.

In step 3008, K is set equal to 0. Operation proceeds from step 3008 to step 3010. In step 3010, first and second derivatives of smoothed histogram at level K are computed. Operation proceeds from step 3010 to step 3011. In step 3011 zero-crossings of first and second derivatives of smoothed histogram are computed. Operation proceeds from step 3011 to step 3012. In step 3012 K is incremented by one. Operation proceeds from step 3012 to step 3014.

In step 3014 a check is made to determine if the value of K is less than or equal to the final value. In one example, final value=256. If K is less than or equal to final value, then operation proceeds from step 3014 to step 3015; otherwise operation proceeds to return step 3016. In step 3015, a smoothed histogram at level K is generated, e.g., computed, from the smoothed histogram at level K−1. In some embodiments, the generating a smoothed histogram in step 3105 includes using a filter with weights, e.g., relative weights 1, 4, 6, 4, 1. Operation proceeds from step 3015 to step 3010.

Returning to step 3016, in step 3016 subroutine 3000 returns the generated one or more smoothed histograms to the routine which called subroutine 3000.

Figure 4:
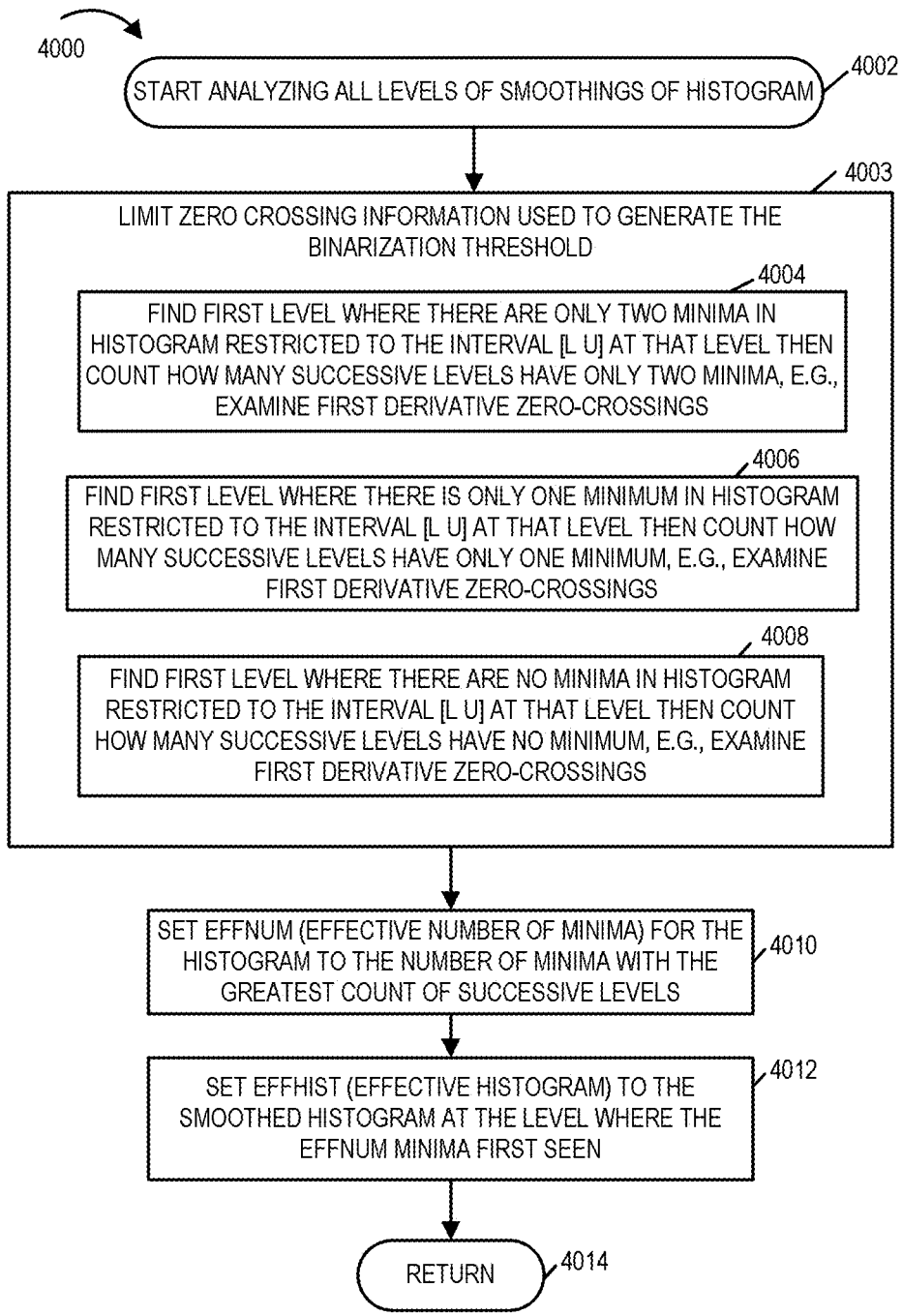
FIG. 4 is a flowchart of a subroutine of a method of analyzing all levels of smoothing of a histogram.

FIG. 4 is a flowchart of a subroutine 4000 of a method of analyzing all levels of smoothing of a histogram. Operation proceeds from start step 4002 to step 4003. In step 4003 the zero crossing information used to generate the binarization threshold is limited.

Start in step 4004 by progressing sequentially through the levels of successive histogram smoothings generated in exemplary subroutine 3000 of FIG. 3, looking for the first level (if there is one) at which the smoothed histogram has only two minima within the interval [L U]. The minima occur at the zero-crossings of the first derivative that signify a minimum point between the truncation points. Then continue progressing through the levels until reaching a level at which the smoothed histogram no longer has only two minima within the interval [L U] or there are no more levels to examine. Make note of the count of successive levels where only two minima were seen.

Continue in step 4006 by progressing sequentially through the levels of successive histogram smoothings generated in exemplary subroutine 3000 of FIG. 3, looking for the first level (if there is one) at which the smoothed histogram has one minimum within the interval [L U]. The minimum occurs at the zero-crossings of the first derivative that signify a minimum point between the truncation points. Then continue progressing through the levels until reaching a level at which the smoothed histogram no longer has only one minimum within the interval [L U] or there are no more levels to examine. Make note of the count of successive levels where only one minimum was seen.

Continue in step 4008 by progressing sequentially through the levels of successive histogram smoothings generated in exemplary subroutine 3000 of FIG. 3, looking for the first level (if there is one) at which the smoothed histogram has no minima within the interval [L U]. The minima occur at the zero-crossings of the first derivative that signify a minimum point between the truncation points. Then continue progressing through the levels until there are no more levels to examine. Make note of the count of successive levels where no minima were seen.

The largest value of the noted counts of successive smoothings with zero, one, or two minima is recognized as the steadiest classification of the true number of minima, based on persistence over successive smoothings. In step 4010 the effective number of minima (EFFNUM) is set to that number of minima having the largest count of successive levels. Operation proceeds from step 4010 to step 4012. In step 4012 the effective histogram (EFFHIST) is set to the smoothed histogram at the level where the EFFNUM minima is first seen. Operation proceeds from step 4012 to RETURN step 4014, which returns EFFNUM and EFFHIST to the routine which called subroutine 4000.

Figure 5:
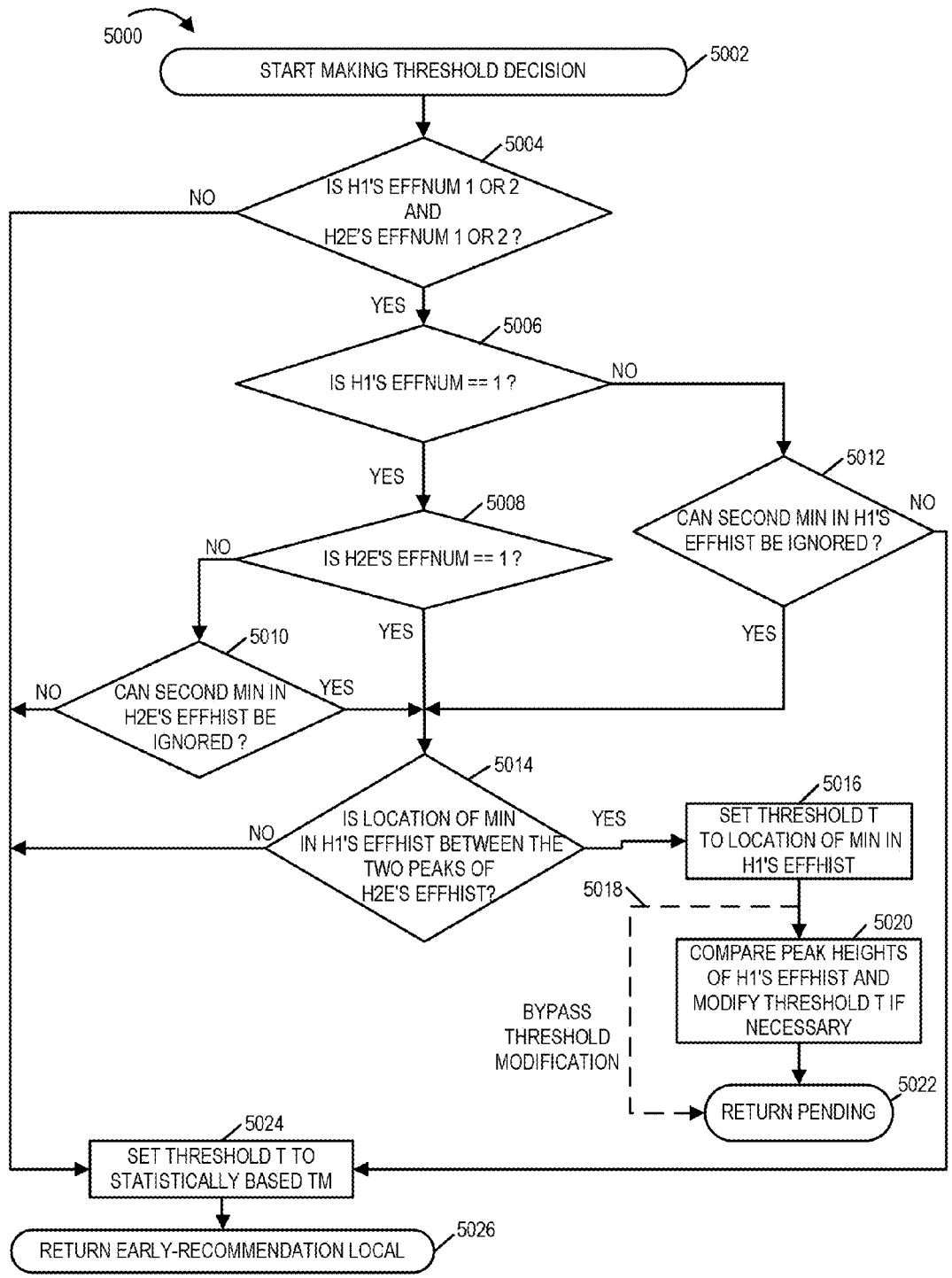
FIG. 5 is a flowchart of a subroutine of a method of making a threshold decision.

FIG. 5 is a flowchart of a subroutine 5000 of a method of making a threshold decision. In FIG. 5, the results of the analyses of the smoothed edge pixels and image histograms are used to find the best global threshold and to make a preliminary recommendation of local or global binarization. Operation proceeds from start step 5002 to step 5004. In step 5004, the EFFNUM's for the smoothed image histograms and edge pixels histograms (H1'S EFFNUM and H2E'S EFFNUM) are checked. If either H1'S EFFNUM or H2E'S EFFNUM is not 1 or 2, then a minimum to further consider has not been found, and operation proceeds from step 5004 to step 5024, in which Threshold T is set to statically based TM; operation proceeds from step 5024 to step 5026, in which subroutine 5002 returns an early recommendation to use local thresholding to the routine which called subroutine 5000. Otherwise operation proceeds from step 5004 to step 5006. In step 5006 a further check of H1's EFFNUM is performed. If two minima were found in the smoothed image histograms (H1'S EFFNUM=2 and H1'S EFFNUM is not equal to 1), then there is a need to decide if the second minimum in H1'S EFFHIST can be ignored, and operation proceeds from step 5006 to step 5012. If the second minimum cannot be ignored then operation proceeds from step 5012 to step 5024, in which Threshold T is set to statically based TM; operation proceeds from step 5024 to step 5026, in which subroutine 5000 returns an early recommendation to use local thresholding to the routine which called subroutine 5000. Returning to step 5012, if the second minimum in H1'S EFFHIST can be ignored, then a single minimum has been found that is a tentative candidate to be the global threshold, and operation proceeds from step 5012 to step 5014.

Returning to step 5006, if H1's EFFNUM is 1, meaning only one minimum was found in the smoothed image histograms, then operation proceeds from step 5006 to step 5008, there is a need to check H2E's EFFNUM to validate that minimum. In step 5008, H2E'S EFFNUM is compared to 1. If two minima were found in the smoothed edge pixels histograms (H2E'S EFFNUM=2), then there is a need to decide if the second minimum can be ignored, and operation proceeds from step 5008 to step 5010. If it is decided in step 5010 that the second minimum in H2E'S EFFHIST cannot be ignored, then operation proceeds from step 5010 to step 5024, in which Threshold T is set to statically based TM; operation proceeds from step 5024 to step 5026, in which subroutine 5000 returns an early recommendation to use local thresholding to the routine which called subroutine 5000. If it is decided in step 5010 that the second minimum in H2E'S EFFHIST can be ignored, then the single minimum found in the smoothed image histograms has been validated as a tentative candidate to be the global threshold, and operation proceeds from step 5010 to step 5014.

In step 5014 a sanity check of the candidate global threshold is performed. In step 5014, the location of the minimum found in the smoothed image histograms, i.e., the minimum in H1's EFFHIST, is checked to determine if it lies between the two peaks of the smoothed edge pixels histograms, i.e. between the peaks of H2E's EFFHIST. If the location of the minimum found in the smoothed image histograms does not lie between the two peaks of the smoothed edge pixel histograms, then that minimum is rejected, and operation proceeds from step 5014 to step 5024, in which Threshold T is set to statically based TM; operation proceeds from step 5024 to step 5026, in which subroutine 5000 returns an early recommendation to use local thresholding to the routine which called subroutine 5000. However, if the location of the minimum found in the smoothed image histograms does lie between the two peaks of the smoothed edge pixel histograms, then operation proceeds from step 5014 to step 5016. In step 5016 threshold T is set to that candidate minimum, which is the location of the minimum in H1'S EFFHIST. In some embodiments, operation proceeds from step 5016, via routing 5018, to return pending step 5022 in which subroutine 5000 returns to the routine which called subroutine 5000 a recommendation for global thresholding with the threshold T, but a later sanity check could undo that recommendation. In some embodiments, there is a situation where the threshold T may need modification, and operation proceeds from step 5016 to optional step 5020.

Prior to step 5020 the single minimum that is the best value for the global binarization threshold was found. There is one last optional check done that may adjust the threshold point. If the histogram hump representing the foreground pixels is very small compared to the one representing the background, the minimum point on the smoothed histogram may be too close to the foreground and the binarized image too thin. For such cases, a modification can be done to the threshold T to try to move it away from the foreground and thereby improve the binarization. One exemplary modification is to generate a new threshold T as a weighted combination of the value of the minimum point and the statistically based threshold TM, with the relative weight being determined by the heights of the peaks.

In step 5020 the peak heights of H1's EFFHIST are compared, and the threshold T is modified if necessary. If the height of the foreground peak is less than some percentage of the height of the background peak (for example 20 percent), a weighted combination is taken, with the weight assigned to threshold TM being for example a piecewise quadratic function of the difference between the ratio of the heights and 20 percent, so that when the ratio of the heights is 20 percent (or greater), all the weight is given to the minimum point, with a gradual decrease in the weight given to the minimum and an increase of the weight given to the threshold TM, as the ratio of the heights decreases.

Now that the best global threshold value for the image has been found, which can be the found minimum or the fallback threshold TM, that value can be retuned or, if it has not been decided on local yet and it is desired to make a recommendation between global or local, other criteria can be looked at for deciding global or local thresholding.

Figure 6:
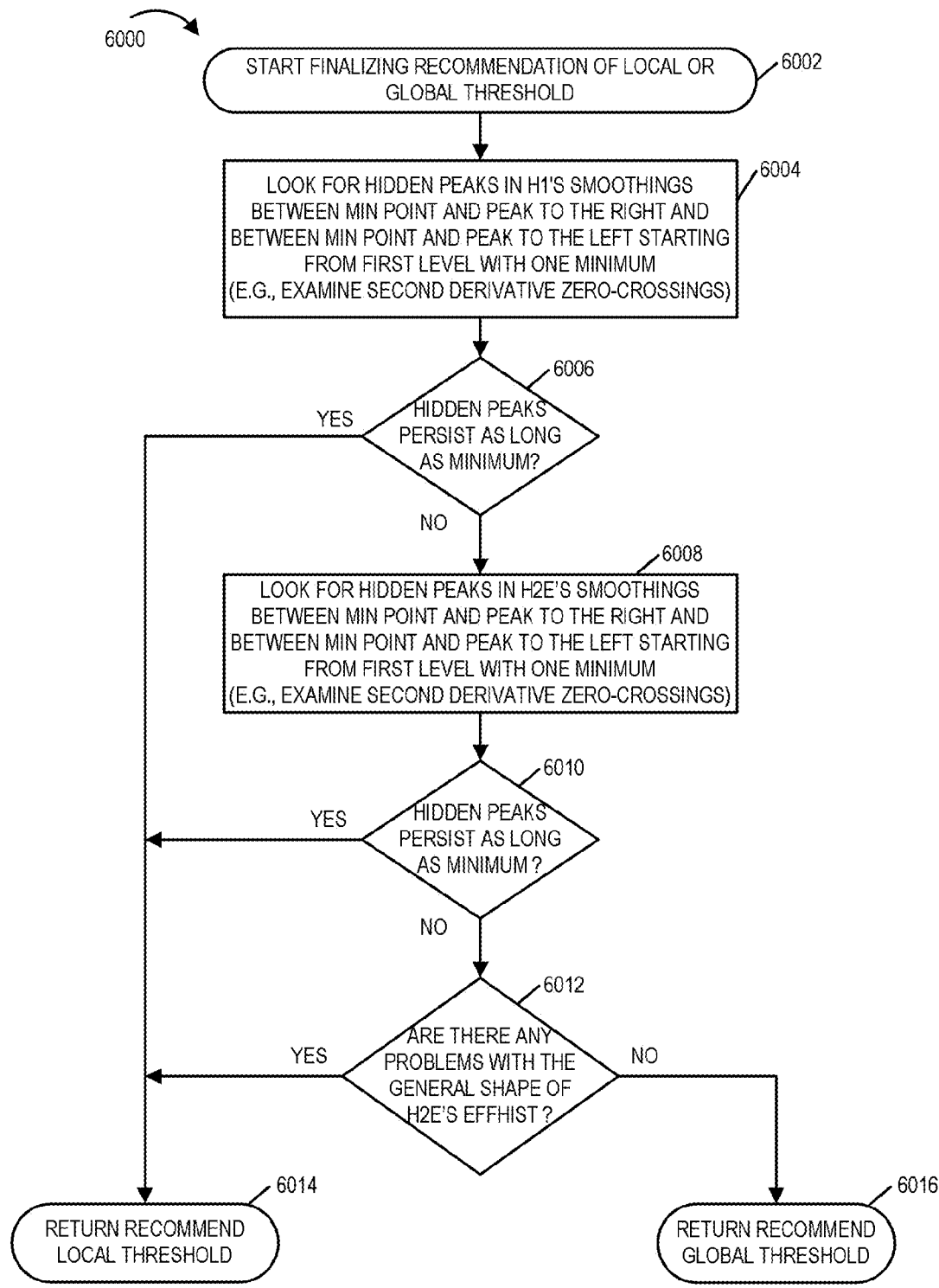
FIG. 6 is a flowchart of a subroutine of a method of finalizing the recommendation of local or global thresholding by performing some further analyses of the histograms to ascertain some relevant characteristics.

FIG. 6 is a flowchart of a subroutine 6000 of a method of finalizing the recommendation of local or global thresholding by performing some further analyses of the histograms to ascertain some relevant characteristics. One exemplary check is to confirm effectively a bimodal image within the interval of interest by looking for hidden peaks in the smoothed image histograms of H1; a bimodal image than can be binarized globally will not have persistent hidden peaks. If hidden peaks do persist, then the recommendation is to use local thresholding. Another check is to look for hidden peaks in the smoothed edge pixels histograms of H2E; if hidden peaks do persist, then the recommendation is to use local thresholding. Final checks examine the general shape of the effective histogram of the edge pixel graylevels H2E for characteristics expected of an image that can be globally binarized.

Step 6004 looks for hidden peaks in H1's smoothings between the minimum point and the peak to the right and between the minimum point and the peak to the left by checking the number of zero-crossings of the second derivative, for example, for the scale levels starting with the first one having only one minimum in the interval [L U]. This is the level where the location of that minimum is a tentative threshold for global binarization. Each zero-crossing of the second derivative of the histogram occurs at an inflection point; an inflection point that persists through successive smoothings indicates the location of a hidden peak in the histogram. The inventive method counts the number of scales, starting from the scale where the single minimum first occurred, that there is more than one inflection point between the minimum and the next maximum to the right at a particular scale. If that number of scales is comparable to the number of scales that continue to show the single minimum point, consider that persistent and indicative of non-bimodality, recommend local binarization and exit. The same test is made for zero crossings of the second derivatives between the single minimum and the maximum point to the left of it.

In step 6006, which follows step 6004, a determination is made as to whether hidden peaks in H1's smoothing persist as long as the minimum persists. If it is determined that hidden peaks persist as long the minimum, then operation proceeds from step 6006 to step 6014, in which local binarization is recommended; otherwise, operation proceeds from step 6006 to step 6008.

Step 6008 does a similar test for persistence of more than one inflection point (zero-crossing of the second derivative) in the smoothed levels of the histogram of the graylevels of edge pixels, between the single minimum and the maximum point just to the right of it, as well as to the left. Thus, step 6008 looks for hidden peaks in H2E's smoothings between the minimum point and the peak to the right and between the minimum point and the peak to the left by checking the number of zero-crossings of the second derivative, for example, for the scale levels starting with the first one having only one minimum in the interval [L U]. This is the level where the location of that minimum is a tentative threshold for global binarization. Each zero-crossing of the second derivative of the histogram occurs at an inflection point; an inflection point that persists through successive smoothings indicates the location of a hidden peak in the histogram. The inventive method counts the number of scales, starting from the scale where the single minimum first occurred, that there is more than one inflection point between the minimum and the next maximum to the right at a particular scale. If that number of scales is comparable to the number of scales that continue to show the single minimum point, consider that persistent and indicative of non-bimodality, recommend local binarization and exit. The same test is made for zero crossings of the second derivatives between the single minimum and the maximum point to the left of it.

If more than one inflection point persists, recommend local binarization and exit. Operation proceeds from step 6008 to step 6010. In step 6010, a determination is made as to whether hidden peaks in H2E's smoothing persist as long as the minimum persists. If it is determined that hidden peaks persist as long the minimum, then operation proceeds from step 6010 to step 6014, in which local binarization is recommended; otherwise, operation proceeds from step 6010 to step 6012.

Finally, in step 6012, a few checks of the general shape of the histogram of the edge pixel graylevels are made that are somewhat dependent on the method of classifying edge pixels. In step 6012 checks are made to determine if there are any problems with the general shape of H2E's EFFHIST. The characteristics of this edge graylevel histogram at the scale where it first had a single minimum point are checked, to see if it supports the conclusion of essentially a single foreground and single background representative color. A check is made to confirm that the percentage of edge pixel graylevels between the two peaks is not less than the percentage to the left, or the percentage to the right, of the peaks. A check is made to confirm that the percentage of edge pixel graylevels between the minimum and the left peak is at least some substantial percentage of the percentage between the minimum and the right peak, and the same check in the other direction. A check is made to confirm that the maximum point to the right of the minimum point for the edge pixel graylevel histogram is not too far from the maximum point to the right of the minimum point on the ordinary graylevel histogram and similarly for the maximum point to the left of the minimum point on the edge pixel graylevel histogram. A check is made to confirm that the height of the peak to the left of the minimum point on the edge pixel graylevel histogram is at least some percentage of the height of the peak to the right, and similarly in the reverse direction. A check is made to confirm that the height at each peak exceeds the height at the dip by some percentage. If any of the checks fail, then operation proceeds from step 6012 to step 6014 in which subroutine 6000 returns a recommendation to use local binarization. Otherwise, operation proceeds from step 6012 to step 6016 in which subroutine 6000 returns a recommendation to use a global threshold.

Figure 7:
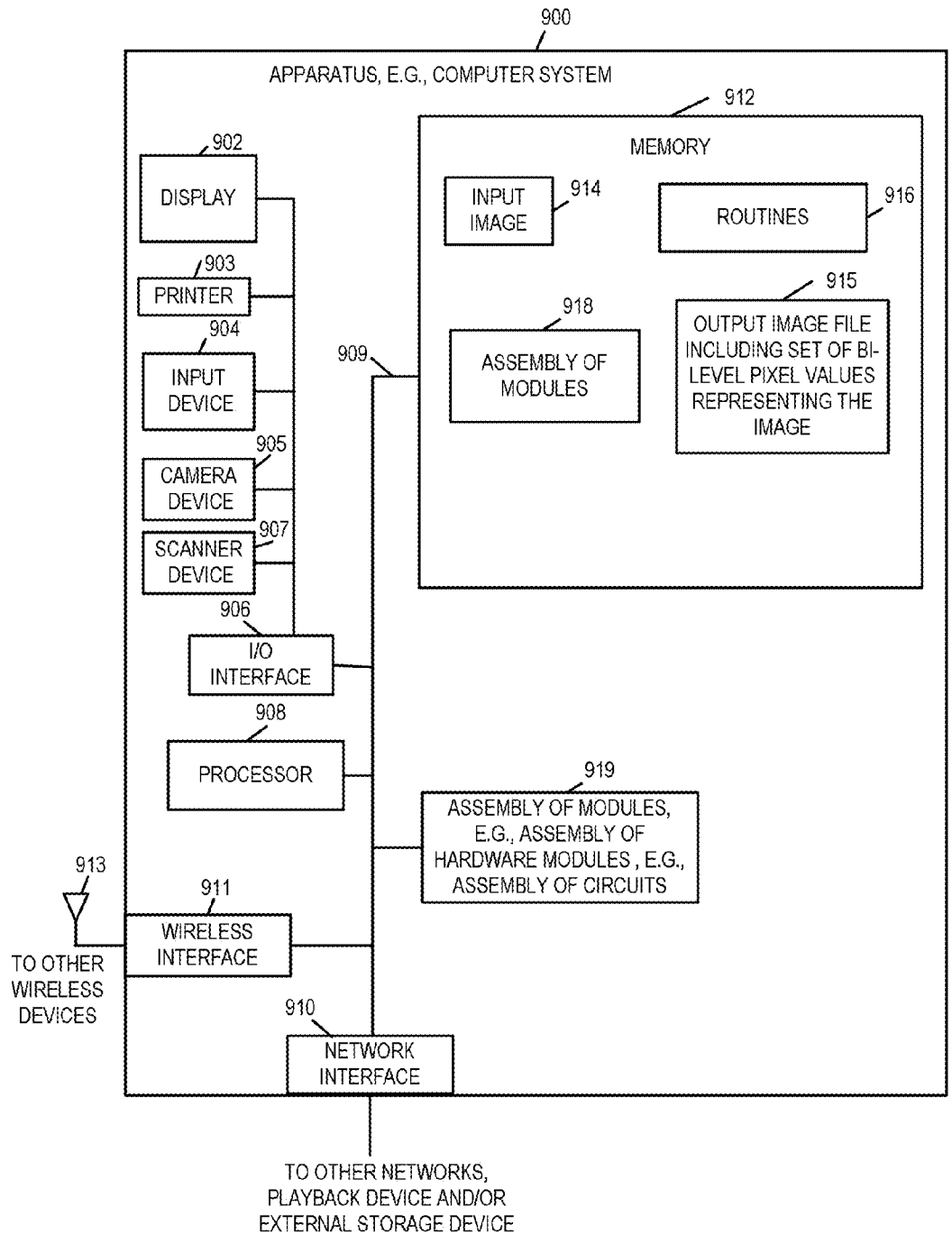
FIG. 7 illustrates an apparatus, e.g., a computer system, capable of processing data, e.g., image data, in accordance with the present invention.

FIG. 7 illustrates an apparatus, e.g., a computer system 900, capable of processing data, e.g., image data, in accordance with the present invention. In some embodiments, apparatus 900 is a portable, e.g., handheld device including wireless communications capability. The system 900 includes various modules for performing the steps of methods of the present invention, e.g., such as the methods of flowchart 2000 of FIG. 2, of flowchart 3000 of FIG. 3, of flowchart 4000 of FIG. 4, of flowchart 5000 of FIG. 5. of flowchart 6000 of FIG. 6, and/or of flowchart 7000 of FIG. 16. In some embodiments the apparatus also stores both the input image data, e.g., a file including input pixel values corresponding to an image to be processed, and processed image data, e.g., a file including a set of bi-level pixel values representing the image.

As shown in FIG. 7, the computer system 900 includes a display 902, a printer 903, an input device 904, a camera device 905, a scanner device 907, an input/output interface 906, a processor 908, a network interface 910, a wireless interface, and a memory 912. The input/output interface 906 is coupled to the display 902, printer 903, input device 904, camera device 905, and scanner device 907, and the input/output device 906 couples those devices (902, 903, 905, 907) to other elements in apparatus 900, via bus 909. The input/output interface 906, processor 908, network interface 910, wireless interface 911, and memory 912 are coupled together by a bus 909 over which the various elements may exchange data and information. The display 902 can be used to display an input image, e.g., a color or grayscale image, and a corresponding bi-level image of bi-level pixel values generated from input pixel values of the input image in accordance with the invention and for displaying one or more control screens which may display control information, e.g., user selected control parameters and information. The user can input control parameters using the input device 904 which may be, e.g., a keyboard or other input device. The camera device 905 may capture an image from which a set of input image pixel values may be obtained. The scanner device 907 may scan a page to obtain an image from which a set of input image pixel values may be obtained. The network interface 910 includes transmitters and receivers for transmitting and receiving data and information. The wireless interface 911 includes transmitters and receivers for transmitting and receiving information, and the wireless interface 911 is coupled to antenna 913, via which data and information, may be communicated to other devices which include wireless capability. In some embodiments the input image data, e.g., a file including input pixel values corresponding to an image to be processed, and/or processed image data, e.g., a file including a set of bi-level pixel values representing the image, are communicated over one or both of network interface 910 and wireless interface 911. The processor 908 performs various operations in accordance with the invention, e.g., under direction of routines 916 and/or one or more of the modules stored in the assembly of modules 918. In some embodiments, the each of the modules in the assembly of modules is included in with routines 916. Routines 916 includes, e.g., main routines and subroutines. While the assembly of modules 918 includes various software modules, the modules may and in some embodiments are, implemented in hardware. In some embodiments, some modules in the assembly of modules 918 are implemented in hardware and other modules in the assembly of modules 918 are implemented in software. In some embodiments computer system 900 includes assembly of modules 919, e.g., an assembly of hardware modules, e.g. circuits, coupled to bus 909.

The memory 912 includes input image data 914 to be processed. The input image data includes a set of input pixel values corresponding to an image, e.g., a color or grayscale image, to be processed. The output image file 915 includes a set of bi-level pixel values representing the image which is the output at the completion of processing performed in accordance with a method of the invention.

Figure 8A:
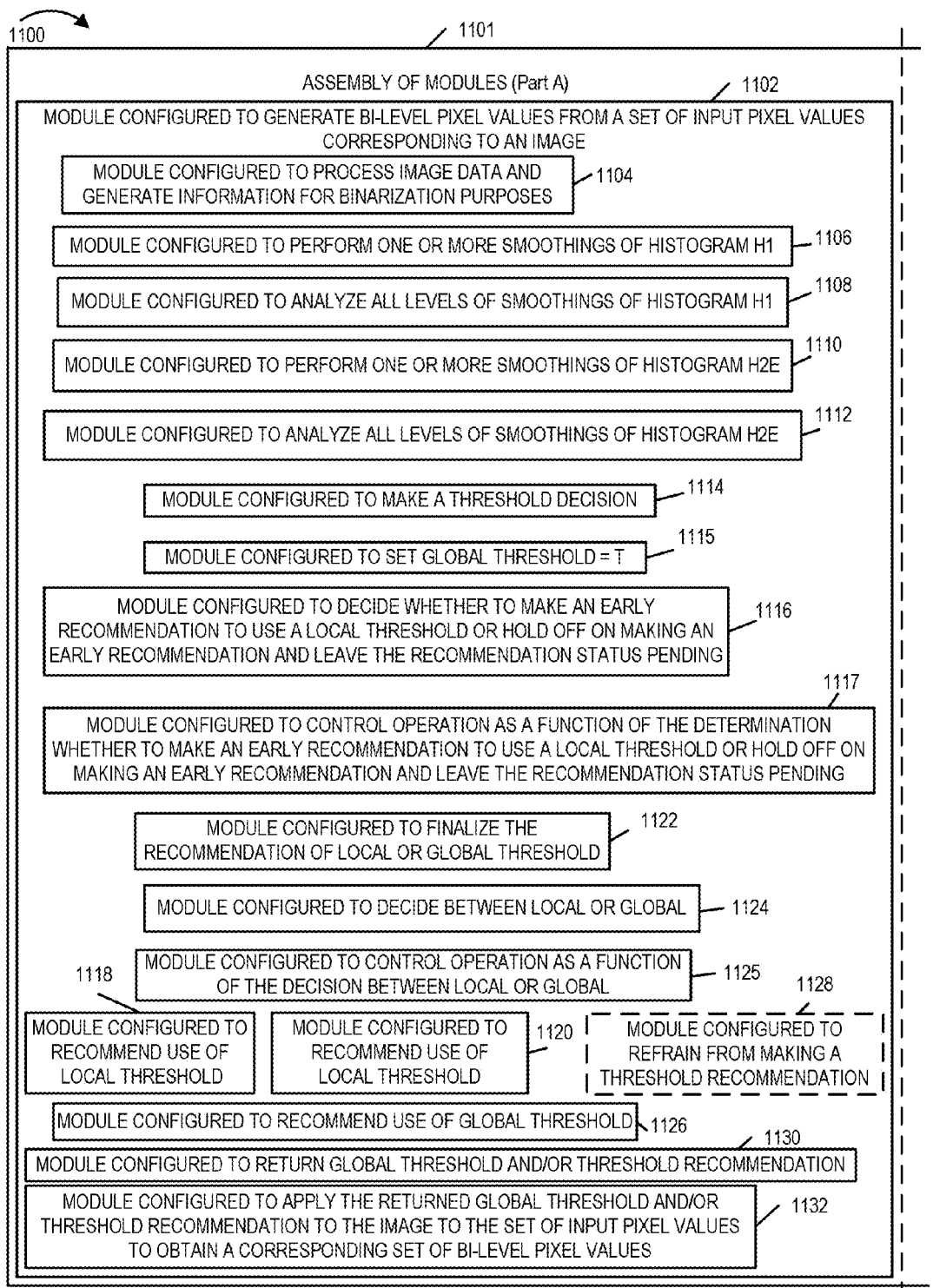
FIG. 8A is a first part of an assembly of modules which can, and in some embodiments is, used in the exemplary system illustrated in FIG. 7.
Figure 8B:
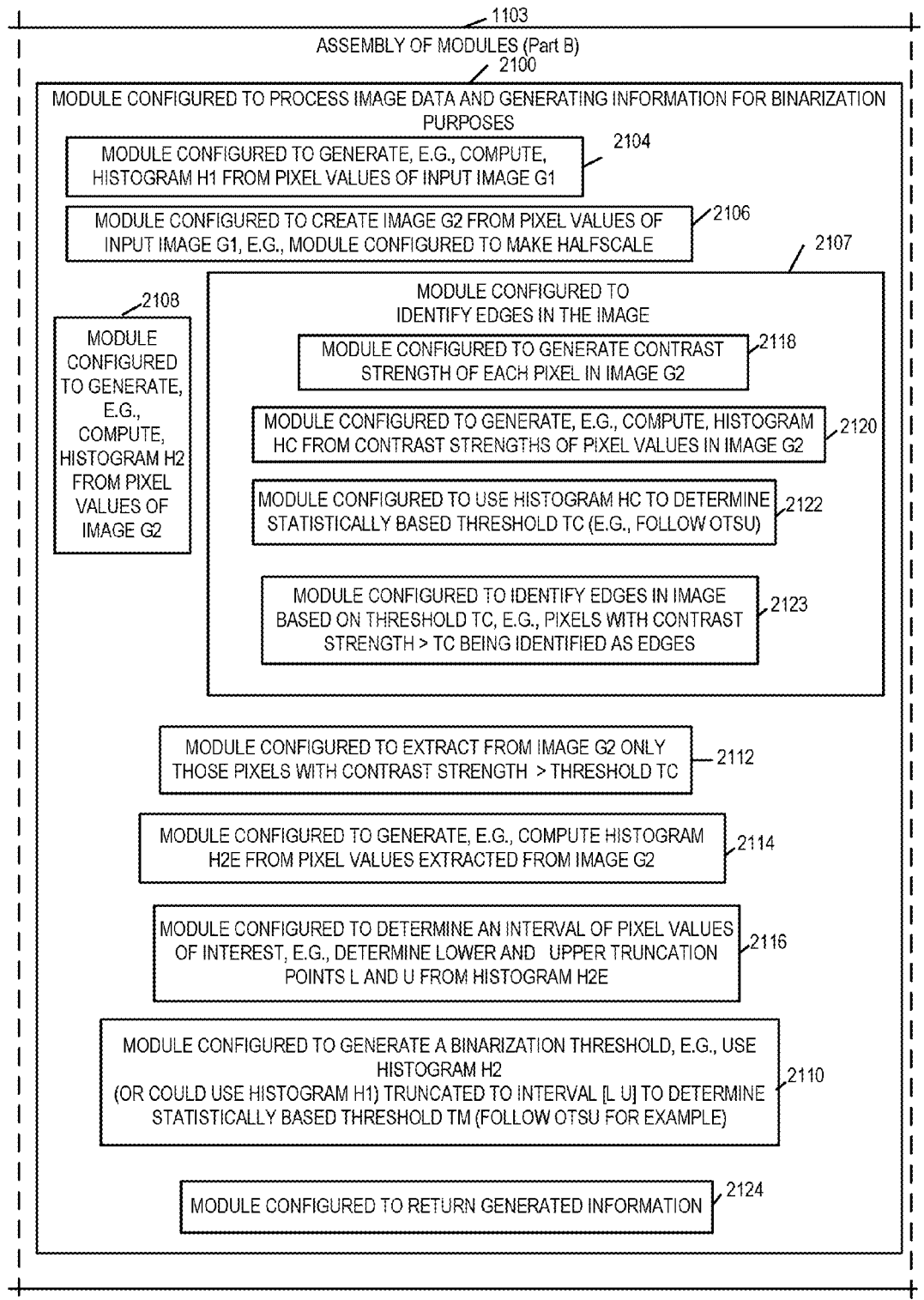
FIG. 8B is a second part of an assembly of modules which can, and in some embodiments is, used in the exemplary system illustrated in FIG. 7.
Figure 8C:
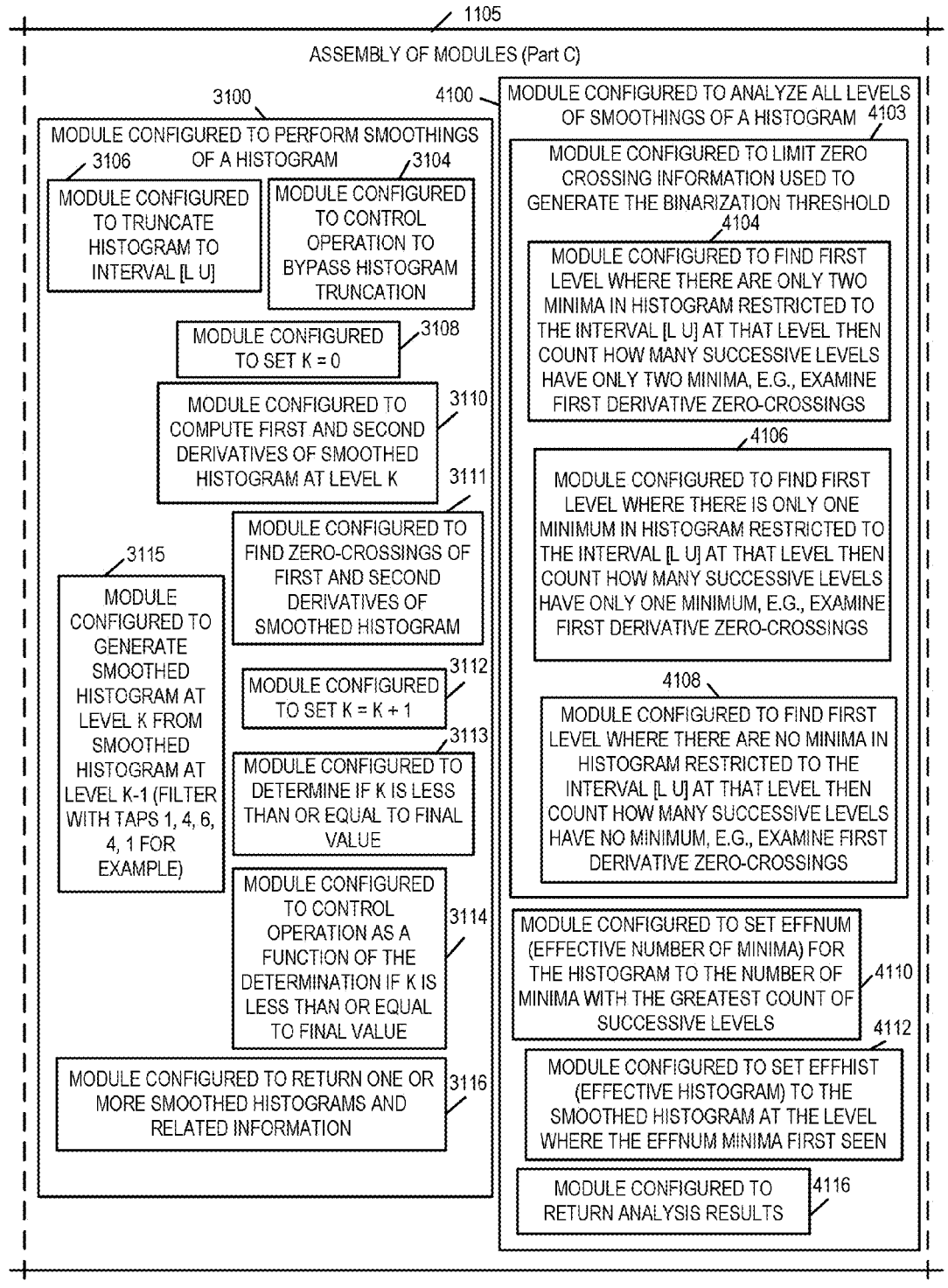
FIG. 8C is a third part of an assembly of modules which can, and in some embodiments is, used in the exemplary system illustrated in FIG. 7.
Figure 8D:
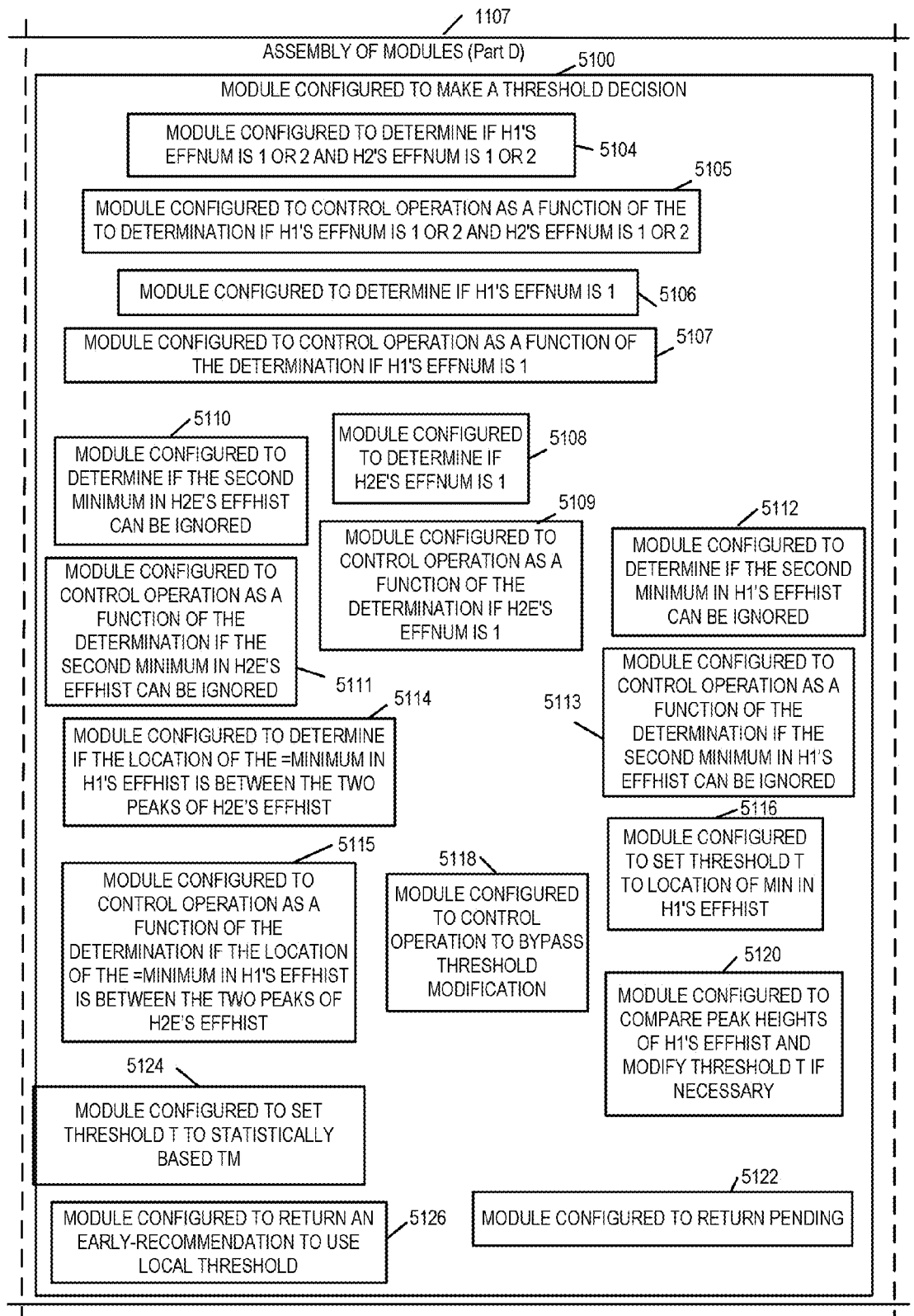
FIG. 8D is a fourth part of an assembly of modules which can, and in some embodiments is, used in the exemplary system illustrated in FIG. 7.
Figures 8, 8E:
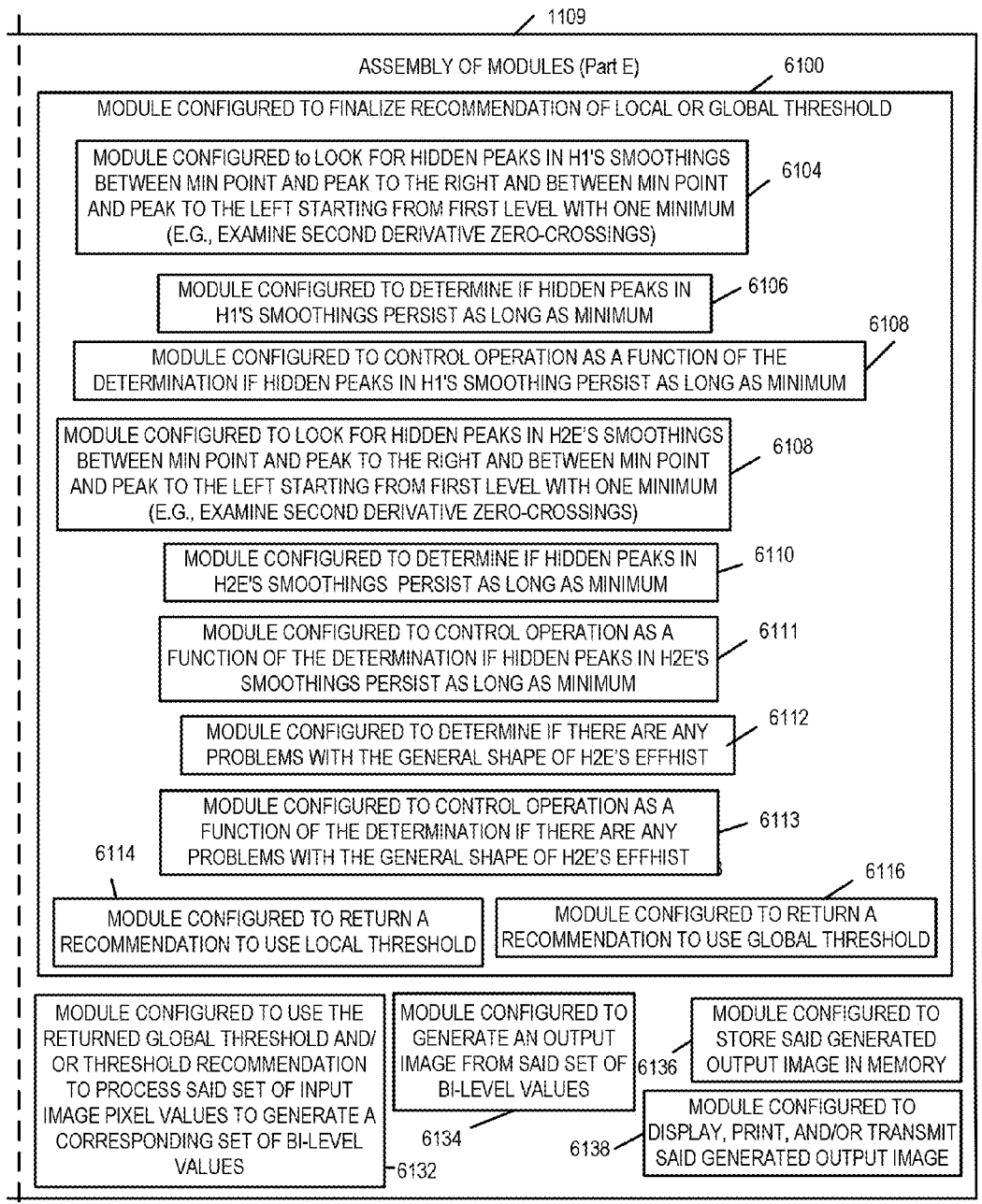
FIG. 8E is a fifth part of an assembly of modules which can, and in some embodiments is, used in the exemplary system illustrated in FIG. 7.
FIG. 8 comprises the combination of FIG. 8A, FIG. 8B, FIG. 8C, FIG. 8D and FIG. 8E.

FIG. 8, which comprises a combination of FIGS. 8A, 8B, 8C, 8D and 8E, illustrates an assembly of modules 1100 which can, and in some embodiments is, used in the exemplary system 900 illustrated in FIG. 7, e.g., as assembly of modules 918. Assembly of modules 1100 includes part A 1101 of the assembly of modules shown in FIG. 8A, part B 1103 of the assembly of modules shown in FIG. 8B, part C 1105 of the assembly of modules shown in FIG. 8C, part D 1107 shown in FIG. 8D and part E 1109 shown in FIG. 8E. Assembly of modules 1100 can be implemented in hardware within the processor 908 of the system 900, e.g., as individual circuits. The modules in the assembly 1100 can, and in some embodiments are, implemented fully in hardware within the processor 908, e.g., as individual circuits. In other embodiments some of the modules are implemented, e.g., as circuits, within the processor 908 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules may be implemented in software and stored in the memory 912 of the system 900 with the modules controlling operation of system 900 to implement the functions corresponding to the modules when the modules are executed by a processor, e.g., processor 908. In some such embodiments, the assembly of modules 1100 is included in the memory 912. In still other embodiments, various modules are implemented as a combination of hardware and software, e.g., with another circuit external to the processor providing input to the processor 908 which then under software control operates to perform a portion of a module's function. While shown in the FIG. 7 embodiment as a single processor, e.g., computer, it should be appreciated that the processor 908 may be implemented as one or more processors, e.g., computers.

When implemented in software the modules include code, which when executed by the processor 908, configure the processor 908 to implement the function corresponding to the module. In embodiments where the assembly of modules 1100 is stored in the memory 912, the memory 912 is a computer program product comprising a computer readable medium comprising code, e.g., individual code for each module, for causing at least one computer, e.g., processor 908, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 8 control and/or configure the system 900 or elements therein such as the processor 908, to perform the functions of the corresponding steps illustrated in the method flowchart 1000 of FIG. 1, the method of flowchart 2000 of FIG. 2, the method of flowchart 3000 of FIG. 3, the method of flowchart 4000 of FIG. 4, the method of flowchart 5000 of FIG. 5 and/or the method of flowchart 600 of FIG. 6. Thus the assembly of modules 1100 includes various modules that perform functions of the corresponding steps of the method shown in FIG. 1, FIG. 2, FIG. 3, FIG. 4, FIG. 5 and/or FIG. 6.

Assembly of modules 1100 includes a module 1102 configured to generate bi-level values from a set of input pixel values corresponding to an image. Module 1102 includes a module 1104 configured to process image data and generate information for binarization purposes, a module 1106 configured to perform one or more smoothing of histogram H1, a module 1108 configured to analayze all levels of smoothing of histogram H1, a module 1110 configured to perform one or more smoothing of histogram H2E, and a module 1112 configured to analyze all levels of smoothing of histogram H2E. In some embodiments, module 1104 calls module 2100 and receives information returned from module 2100. In some embodiments, module 1106 calls module 3100 and receives information returned from module 3100. In some embodiments, module 1108 calls module 4100 and receives information returned from module 4100. In some embodiments, module 1110 calls module 3100 and receives information returned from module 3100. In some embodiments, module 1112 calls module 4100 and receives information returned from module 4100.

Module 1102 further includes a module 1114 configured to make a threshold decision, a module 1115 configured to set the global threshold equal to T, a module 1116 configured to decide whether to make an early recommendation to use a local threshold or hold off on making an early recommendation and leave the recommendation status pending, and a module 1117 configured to control operation as a function of the determination whether to make an early recommendation to use a local threshold or hold off on making an early recommendation and leave the recommendation status pending. Module 1102 further includes a module 1118 configured to recommend use of a local threshold, a module 1120 configured to recommend use of a local threshold, a module 1122 configured to finalize the recommendation of local or global threshold, a module 1124 configured to decide between local or global, a module 1125 configured to control operation as a function of the decision between local or global, and a module 1126 configured to recommend the use of a global threshold. In some embodiments, module 1102 includes a module 1128 configured to control operation to refrain from making a threshold recommendation. Module 1102 further includes a module 1130 configured to return a global threshold and/or a threshold recommendation, and a module 1132 configured to apply the retuned global threshold and/or threshold recommendation to the image to the set of input pixel values to obtain a corresponding set of bi-level pixel values.

In some embodiments, module 1114 calls module 5100 and received retuned information from module 5100. In some embodiments, module 1122 calls module 6100 and receives returned information from module 6100.

Assembly of modules 1100 further includes a module 2100 configured to process image data and generate information for binarization purposes, a module 3100 configured to perform smoothing of a histogram, a module 4100 configured to analyze all levels of smoothing of a histogram, a module 5100 configured to make a threshold decision, and a module 6100 configure to finalize the recommendation of local or global threshold. Module 2100 includes a module 2104 configured to generate, e.g., compute, histogram H1 from pixel values of input image G1, a module 2106 configured to create image G2 from pixel values of input image G1, e.g., a module configured to make a halfscale image, a module 2107 configured to identify edges in the image, a module 2108 configured to generate, e.g., compute, histogram H2 form pixel values of image G2. Module 2107 includes a module 2118 configured to generate contrast strength of each pixel in image G2, a module 2120 configured to generate, e.g., compute, histogram HC from contrast strengths of pixel values in image G2, a module 2122 configured to use histogram HC to determine a statistically based threshold TC, e.g., following an OTSU based method, and a module 2123 configured to identify edges in the image based on threshold TC. In some embodiments, module 2123 identifies pixels with contrast strength greater than TC are edges.

Module 2100 further includes a module 2112 configured to extract from image G2 only those pixels with contrast strength greater than threshold TC, a module 2114 configured to generate, e.g., compute, histogram H2E from pixel values extracted from image G2, and a module 2116 configured to determine an interval of pixel values of interest. In some embodiments, module 2116 determines lower and upper truncation points L and U from histogram H2E. Module 2100 further includes a module 2110 configured to generate a binarization threshold. In some embodiments, module 2110 uses histogram H2 or histogram H1 truncated to interval [L U] to determine a statistically based threshold TM. In some embodiments, an OTSU based method is used in determining TM. Module 2100 further includes a module 2124 configured to return generated information.

Module 3100 includes a module 3106 configured to truncate a histogram to interval [L U], a module 3104 configured to control operation to bypass histogram truncation, a module 3108 configured to set K, a smoothing level index value, to 0, a module 3110 configured to compute first and second derivates of smoothed histogram at level K, a module 3111 configured to find zero-crossings of first and second derivatives of smoothed histogram at level K, a module 3112 configured to set K to K+1, a module 3113 configured to determine if K is less than or equal to final value, a module 3114 configured to control operation as a function of the determination if K is less than or equal to final value, a module 3115 configured to generate a smoothed histogram at level K from the smoothed histogram at level K−1. In some embodiments, module 3115 uses a filter with relative weights 1, 4, 6, 4, and 1. Module 3100 includes a module 3116 configured to return one or more smoothed histograms and related information.

Module 4100 includes a module 4103 configured to limit zero crossing information used to generate the binarization threshold. Module 4103 includes a module 4104 configured to find the first level where there are only two minima in the histogram restricted to the interval [L U] at that level and then count how many successive levels have only two minima, e.g., examine first derivative zero-crossings, a module 4106 configured to find the first level where there is only one minimum in the histogram restricted to the interval [L U] at that level and then count how many successive levels have only on minimum, e.g., examine first derivative zero-crossings, and a module 4108 configured to find the first level where there are no minima in the histogram restricted to [L U] at that level and then count how many successive levels have no minimum, e.g., examine first derivative zero-crossings. Module 4100 further includes a module 4110 configured to set EFFNUM (effective number of minima) for the histogram to the number of minima with the greatest count of successive levels, a module 4112 configured set EFFHIST (effective histogram) to the smoothed histogram at the level where the EFFNUM minima was first seen, and a module 4116 configured to return analysis results.

Module 5100 includes a module 5104 configured to determine if H1's EFFNUM is 1 or 2 and H2's EFFNUM is 1 or 2, a module 5105 configured to control operation as a function of the determination if H1's EFFNUM is 1 or 2 and H2's EFFNUM is 1 or 2, a module 5106 configured to determine if H1's EFFNUM is 1, a module 5107 configured to control operation as a function of the determination if H1's EFFNUM is 1, a module 5108 configured to determine if H2E's EFFNUM is 1, a module 5109 configured to control operation as a function of the determination if H2E's EFFNUM is 1, a module 5110 configured to determine if the second minimum in H2E's EFFHIST can be ignored, a module 5111 configured to control operation as a function of the determination if the second minimum in H2E's EFFHIST can be ignored, a module 5112 configured to determine if the second minimum in H1's EFFHIST can be ignored, and a module 5113 configured to control operation as a function of the determination if the second minimum in H1's EFFHIST can be ignored.

Module 5100 further includes a module 5114 configured to determine if the location of the minimum in H1's EFFHIST is between the two peaks of H2E's EFFHIST, a module 5115 configured to control operation as a function of the determination if the location of the minimum in H1's EFFHIST is between the two peaks of H2E's EFFHIST, a module 5116 configured to set threshold T to the location of the minimum in H1's EFFHIST, a module 5118 configured to control operation to bypass threshold modification, a module 5120 configured to compare peak heights of H1's EFFHIST and modify threshold T is necessary, a module 5022 configured to return pending, a module 5124 configured to set threshold T to the statistically based TM, and a module 5126 configured to return an early recommendation to use local threshold.

Module 6100 includes a module 6104 configured to look for hidden peaks in H1's smoothing between min point and peak to the right and between min point and peak to the left starting from the first level with one minimum, e.g., examine second derivative zero crossings, a module 6106 configured to determine if hidden peaks in H1's smoothing persist as long as minimum, a module 6107 configured to control operation as a function of the determination if hidden peaks in H1's smoothing persist as long as minimum, a module 6108 configured to look for hidden peaks in H2E's smoothing between min point and peak to the right and min point and peak to the left starting form the first level with one minimum, e.g., examine second derivate zero-crossings, a module 6110 configured to determine if hidden peaks in H2E's smoothing persist as long as minimum, and a module 6111 configured to control operation as a function of the determination if hidden peaks in H2E's smoothing s persist as long as minimum. Module 6100 further includes a module 6112 configured to determine if there are any problems with the general shape of H2E's EFFHIST, a module 6113 configured to control operation as a function of the determination if there are any problems with the general shape of H2E's EFFHIST, a module 6114 configured to return a recommendation to use a local threshold, and a module 6116 configured to return a recommendation to use a global threshold.

Assembly of modules 1100 further includes a module 1132 configured to use the returned global threshold and/or threshold recommendation to process said set of input image pixel values to generate a corresponding set of bi-level values, a module 1134 configured to generate an output image from said set of bi-level values, a module 1136 configured to store said generated output image in memory, and a module 1138 configured to display, print, and/or transmit said generated output image.

An example image, plots of some of the histograms generated from that image according to an embodiment of the invention as described above, and example binarizations of that image can be found in FIGS. 9-15. The original graylevel image 9000 is in FIG. 9 and includes dark text against a gray background with a white border all around. Such an image 9000 could come from a scan of a newspaper clipping, for example.

Figure 9:
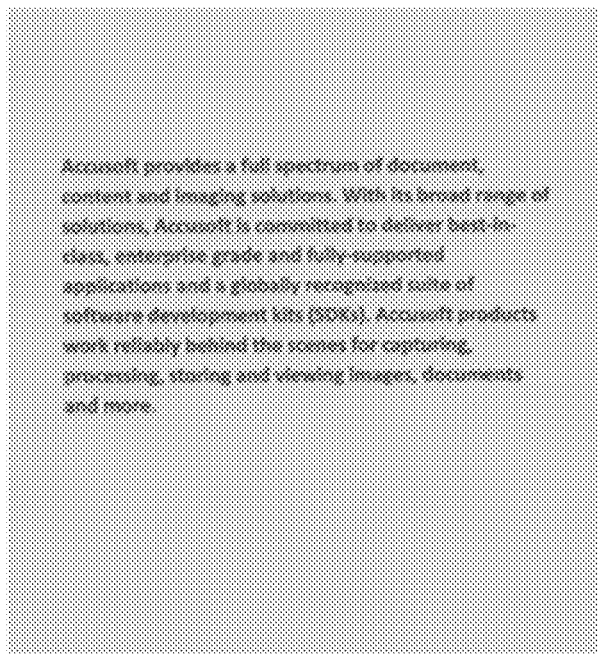
FIG. 9 includes an exemplary image which includes dark text against a gray background with a white border all around, e.g., an image which could come from a scan of a newspaper clipping.
Figure 10:
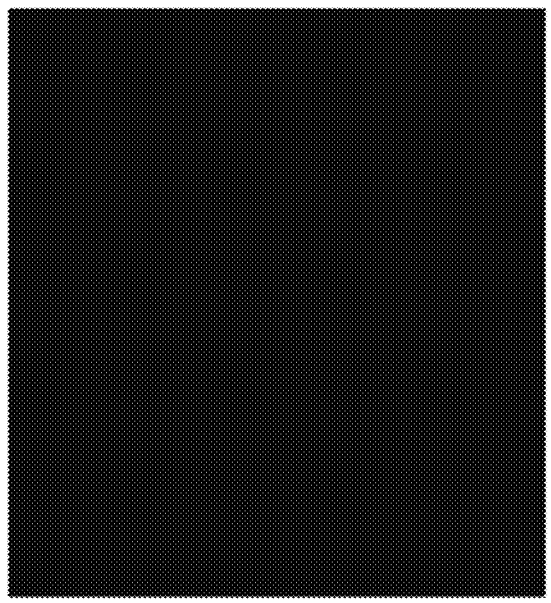
FIG. 10 is all-black resulting output image produced from processing the input image of FIG. 9 in which the processing used binarization resulting from thresholding by the Otsu value=219, computed using Otsu method.
Figure 12:
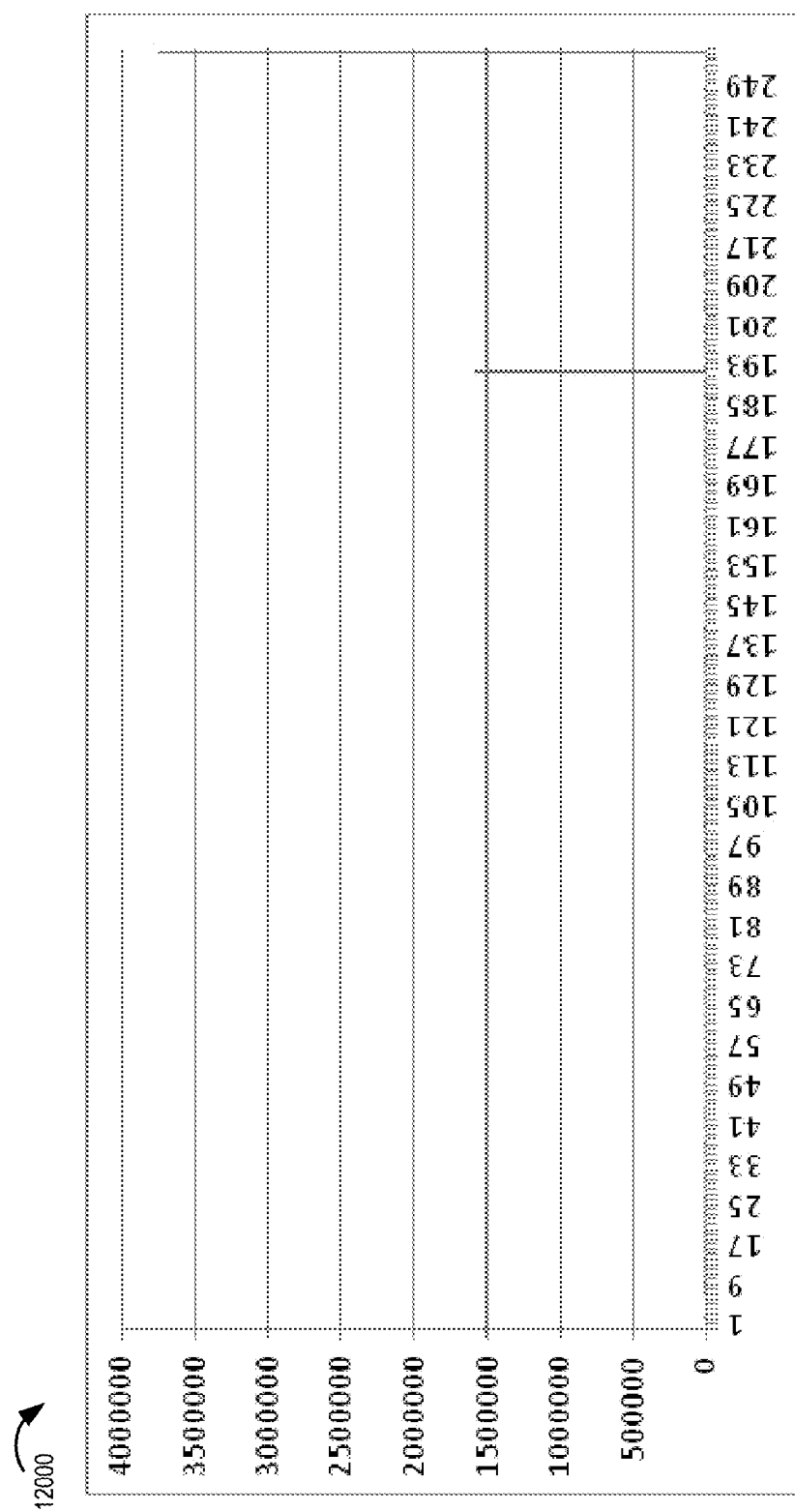
FIG. 12 shows a graylevel histogram of the image of the input image of FIG. 9.
Figure 13:
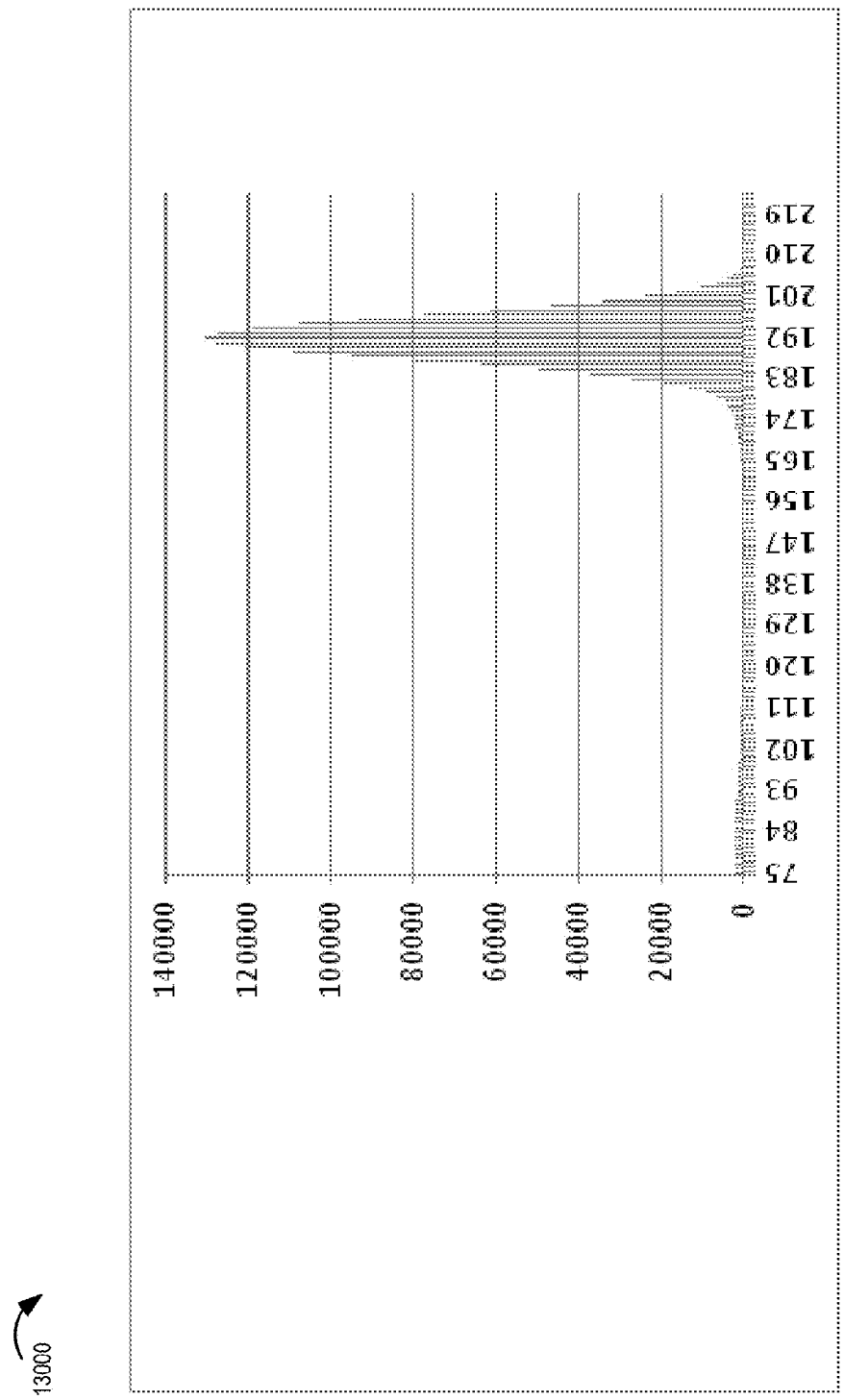
FIG. 13 shows a smoothed graylevel histogram of the input image of FIG. 9 truncated to the interval from 74 to 222, generated in accordance with the methods of the present invention.

FIG. 12 shows the graylevel histogram 12000 of the image 9000 of FIG. 9. It is not very useful because the tall peaks obscure the visibility of the small humps. The global threshold, for this image 9000 of FIG. 9 computed by using the known Otsu method and this image's unmodified histogram 12000 of FIG. 12, is 219. Unfortunately, due to the characteristics of this image, the binarization resulting from thresholding by the Otsu value 219 produces the all-black image 10000 in FIG. 10. This is unacceptable and there is a need for a better global threshold to be found.

Using the inventive methods applied to the example image 9000 of FIG. 9, the 2.5 percent and 97.5 percent truncation points of 74 and 222, respectively, are obtained from the histogram of the graylevels of pixels classified as edge pixels in the half-scale image. The threshold obtained from locating the minimum point in a smoothed scalespace histogram is 150. There were 15 successive smoothings by the binomial filter with relative weights 1, 4, 6, 4, 1 to reach the representative histogram 13000 of FIG. 13 on which the minimum point was located; this smoothed histogram 13000 truncated to the interval from 74 to 222 is in FIG. 13. The location of the minimum point 150 between the foreground and background humps is obtainable from a zero-crossing of the first derivative on this smoothed histogram. The binarization resulting from globally thresholding by this invention's generated threshold of 150 produces the well-binarized image 11000 in FIG. 11.

Figure 14:
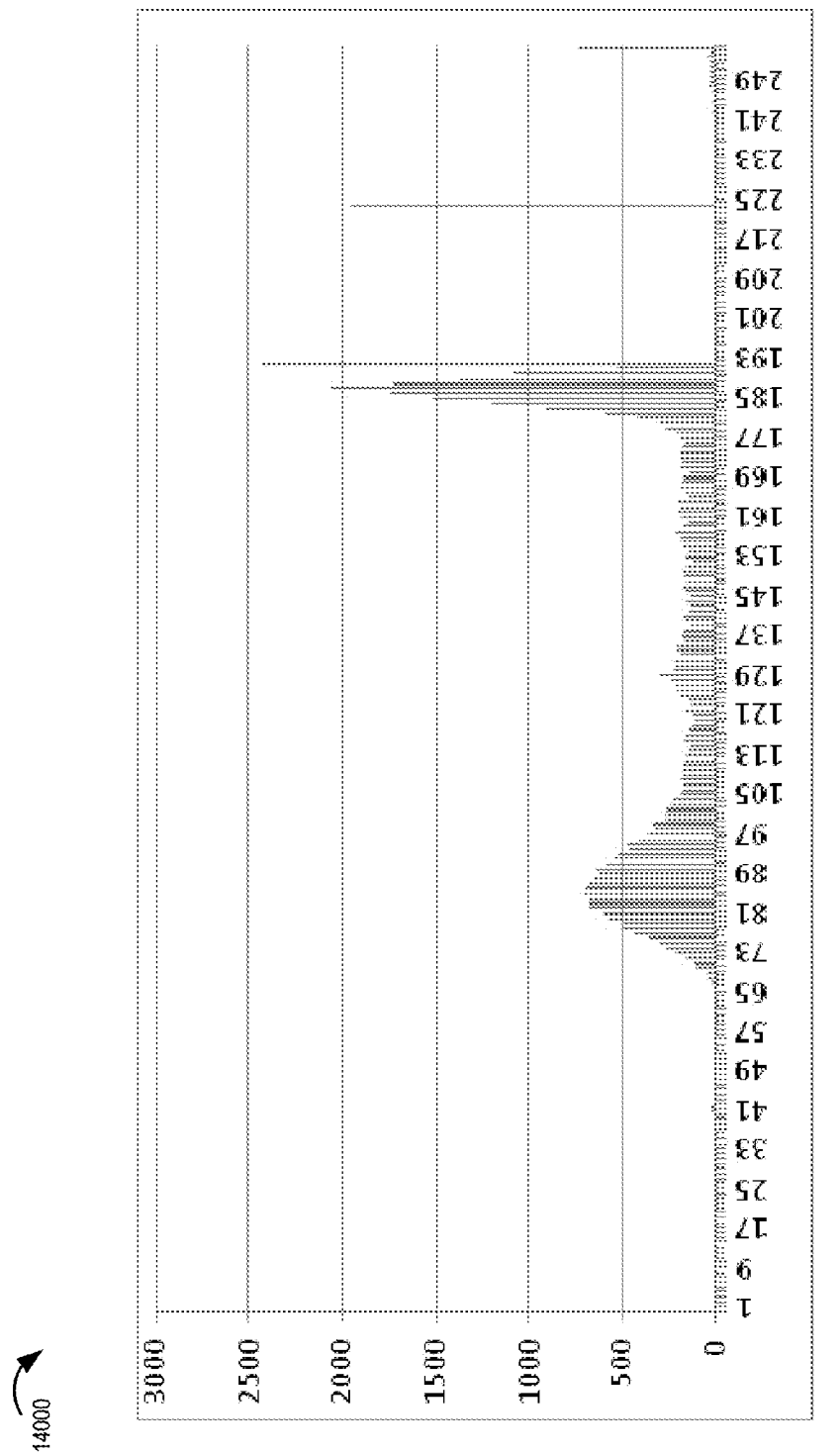
FIG. 14 shows a histogram of graylevels of edge pixels from the half-scale image corresponding to the input image of FIG. 9.
Figure 15:
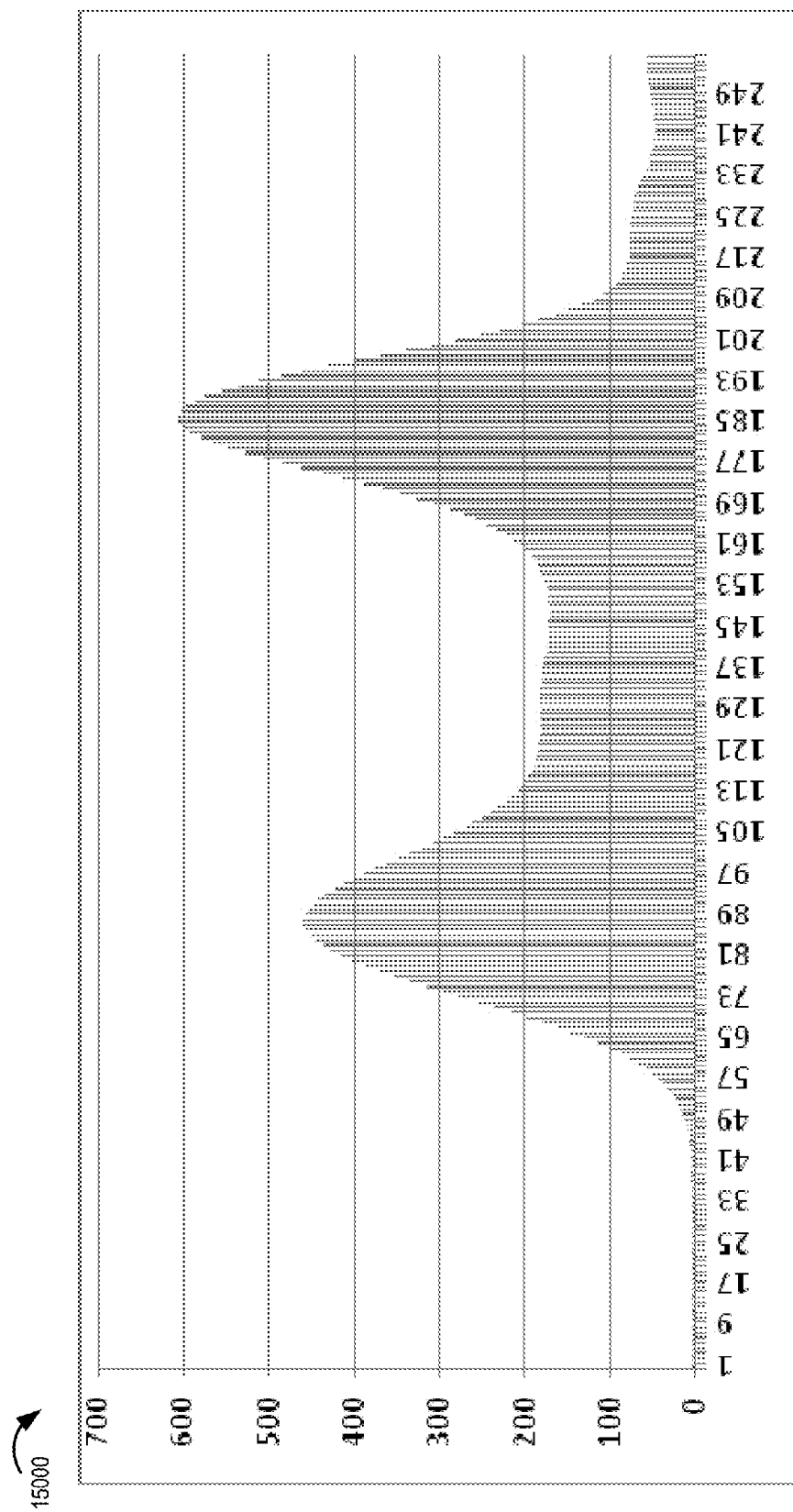
FIG. 15 shows a representative histogram of the graylevels of edge pixels in the half-scale image, corresponding to the input image of FIG. 9, in which said representative histogram was reached after 120 successive smoothings by the binomial filter with relative weights 1, 4, 6, 4, 1, in accordance with the methods of the present invention; this representative edge pixel histogram, generated in accordance with the present invention, is not sensitive to a background having a relatively large area.

The histogram 14000 of graylevels of edge pixels from the half-scale image is shown in FIG. 14. Most of the large number of white pixels in the original image are not classified as edge pixels and therefore do no contribute to, and distort, this histogram as they do to the full image histogram. There were 120 successive smoothings by the binomial filter with relative weights 1, 4, 6, 4, 1 to reach the representative histogram 15000 of the graylevels of edge pixels in the half-scale image; this histogram is in FIG. 15. As can be clearly seen, the edge pixel histogram 15000 is not sensitive to a background having a relatively large area; that background caused the Otsu threshold to fail badly.

Figure 16A:
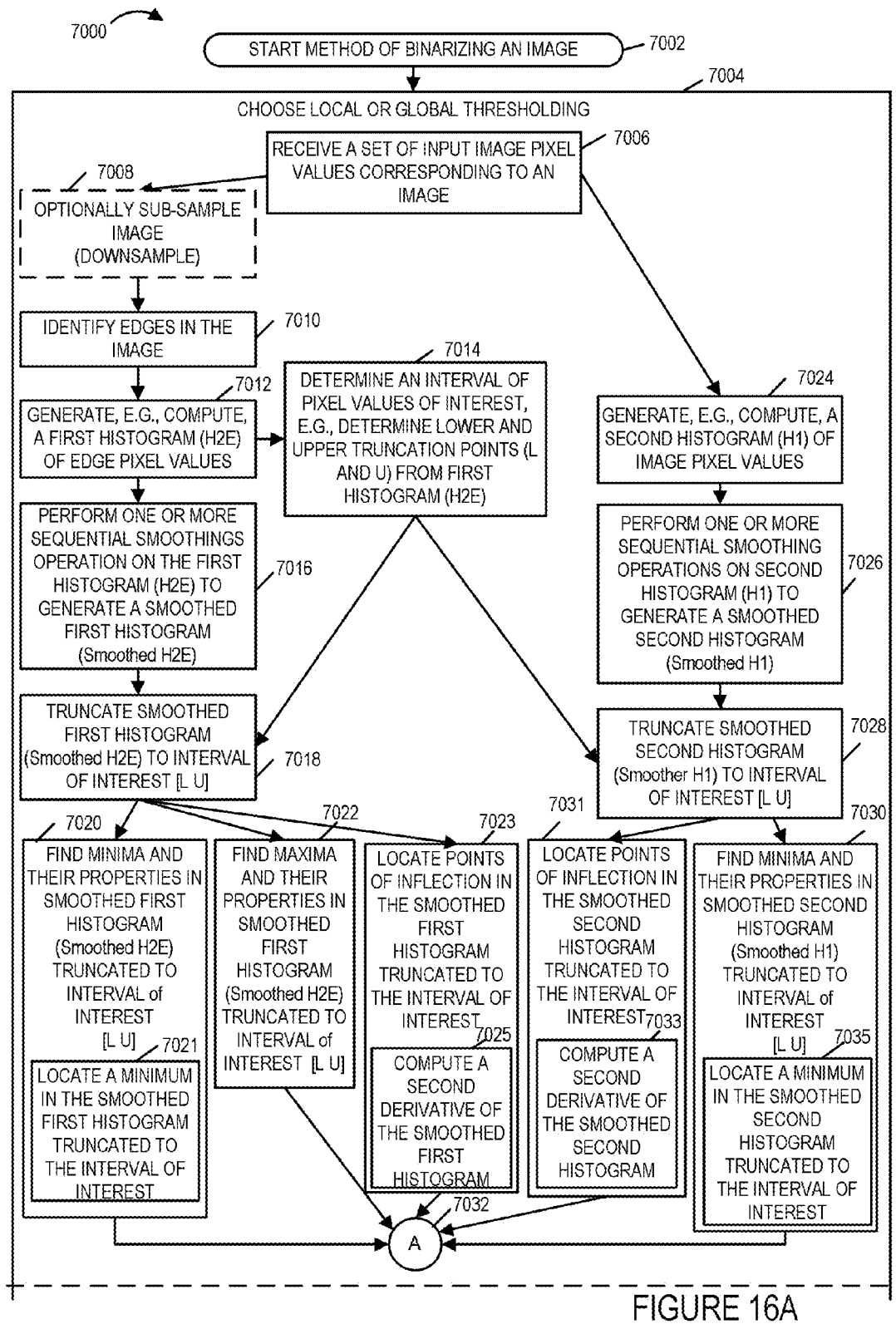
FIG. 16A is a first part of a flowchart of an exemplary method of binarizing an image, in accordance with an exemplary embodiment.
Figure 16B:
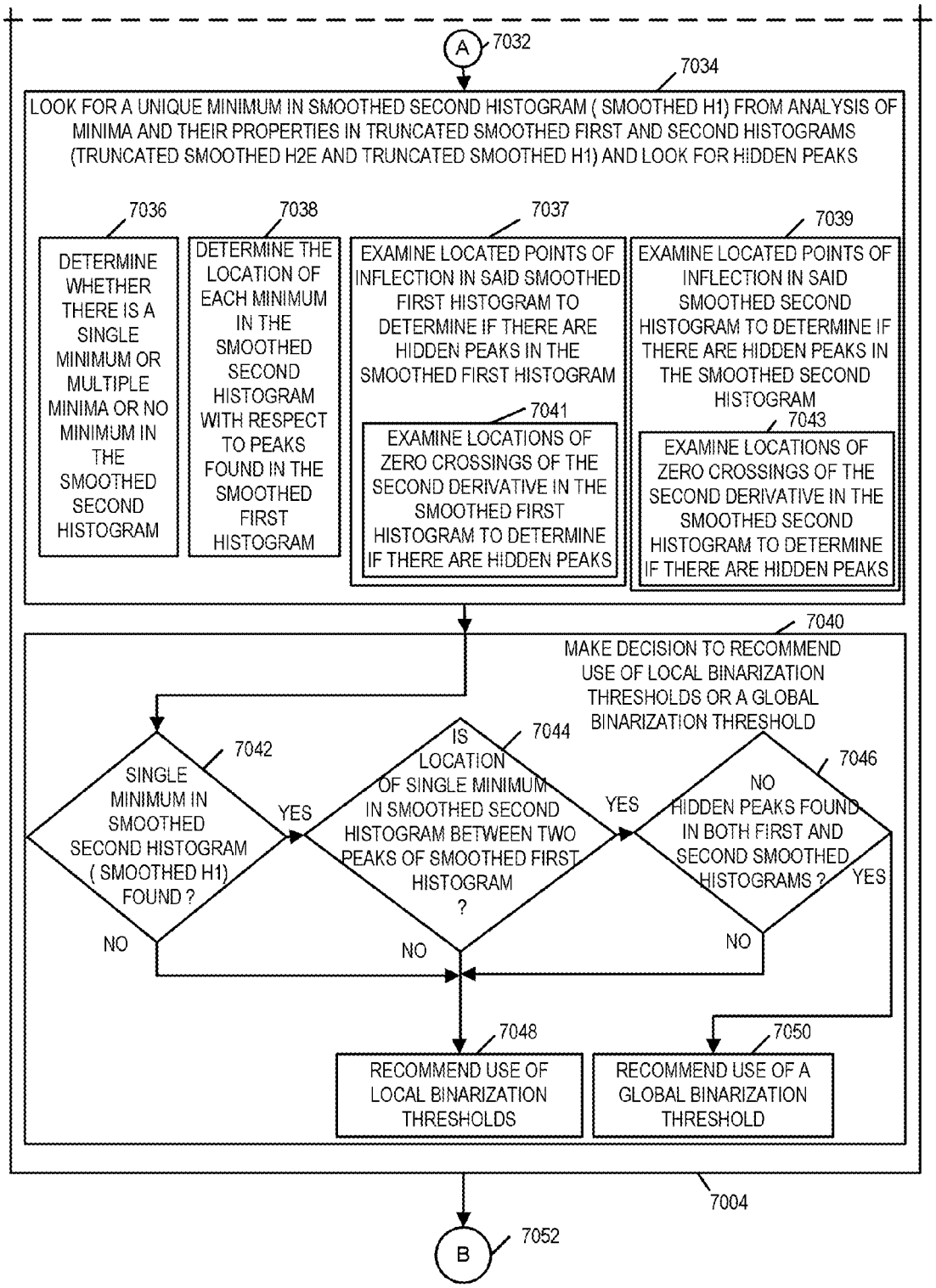
FIG. 16B is a second part of a flowchart of an exemplary method of binarizing an image, in accordance with an exemplary embodiment.
Figures 16, 16A, 16B, 16C:
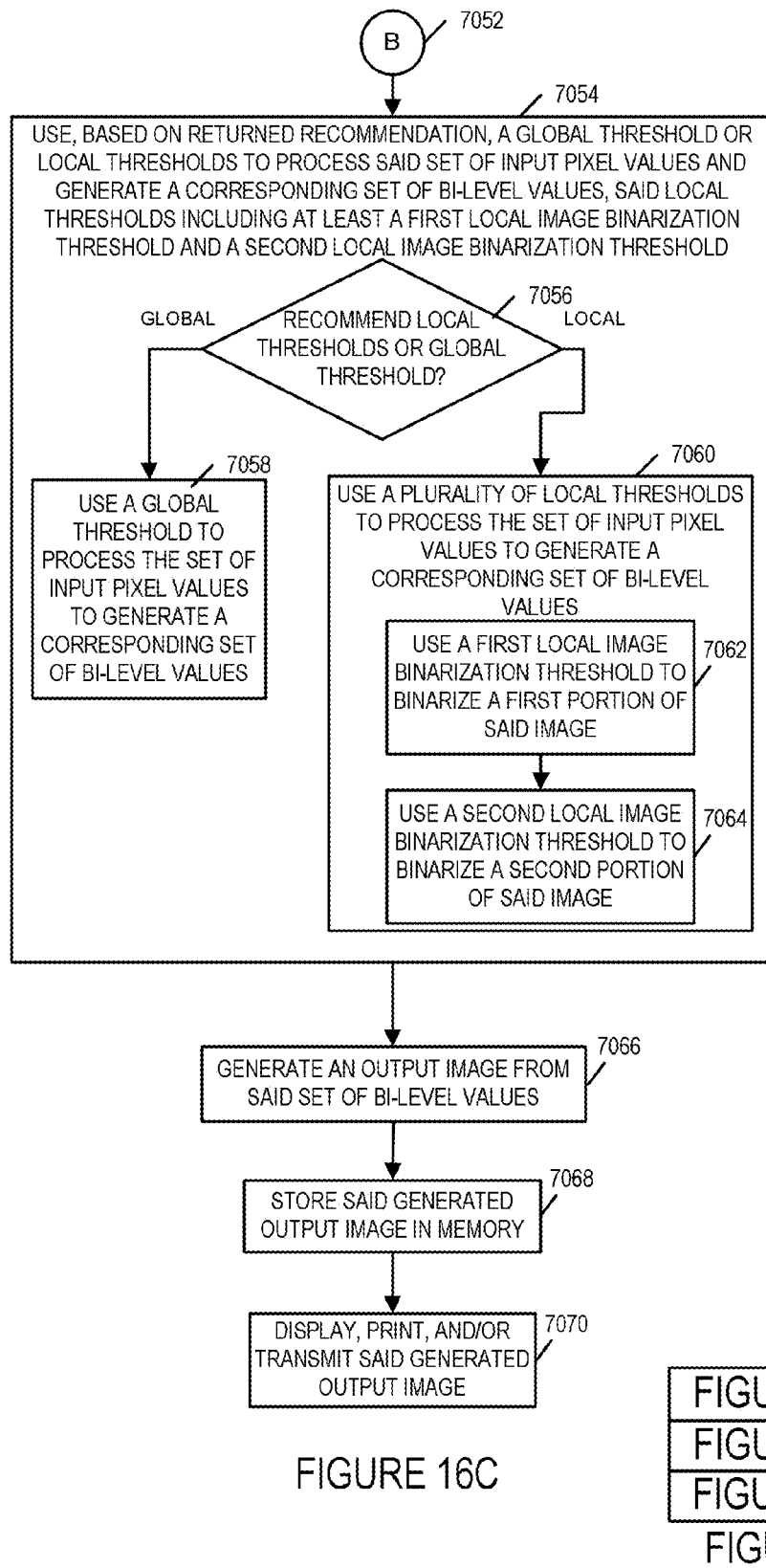
FIG. 16C is a third part of a flowchart of an exemplary method of binarizing an image, in accordance with an exemplary embodiment.
FIG. 16 comprises the combination of FIG. 16A, FIG. 16B and FIG. 16C.

FIG. 16, comprising the combination of FIG. 16A, FIG. 16B and FIG. 16C, is a flowchart 7000 of an exemplary method of binarizing an image in accordance with an exemplary embodiment. Operation of the exemplary method starts in step 7002 and proceeds to step 7004, in which local or global thesholding is chosen. Step 7004 includes steps 7006, optional step 7008, 7010, 7012, 7014, 7016, 7018, 7020, 7022, 7023, 7024, 7025, 7026, 7028, 7030, 7031, 7033, 7034, 7036, 7038, 7037, 7041, 7039, 7043, 7040, 7042, 7044, 7046, 7048 and 7050.

In step 7006 a set of input pixel values corresponding to an image are received, e.g., a set of input pixel grayscale level values corresponding to an image or a set of input pixel values corresponding to a color image. In some embodiments, operation proceeds from step 7006 to optional step 7008 in which the input image is sub-sampled, e.g., down-sampled by two or another factor, and then operation proceeds from step 7008 to step 7010. In other embodiments, operation proceeds from step 7006 to step 7010, in which edges in the image are identified, said edges in the image including edge pixel values. Operation proceeds from step 7010 to step 7012, in which a first histogram, e.g., histogram H2E, of edge pixel values corresponding to the identified edges is generated, e.g., is computed. In some embodiments, optional step 7008 is performed, the first histogram is a histogram of edge pixel values in a sub-sampled version, e.g., downsampled by a two or another factor, of said image. Operation proceeds from step 7012 to step 7014 and step 7016.

In step 7014, an interval of pixel values of interest is determined, e.g., lower and upper truncation points (L and U) are determined from the first histogram (H2E). Thus, the interval of pixel values of interest is based on the generated first histogram.

In step 7016 one or more sequential smoothing operations are performed on the first histogram of edge pixel values, e.g., histogram H2E, to generate a smoothed first histogram of edge pixel values, e.g., smoothed H2E. Operation proceeds from step 7016 to step 7018.

Returning to step 7006, operation also proceeds from step 7006 to step 7024. In step 7024, a second histogram, e.g., histogram H1, of image pixel values is generated, e.g., is computed. Operation proceeds from step 7024 to step 7026. In step 7026 one or more sequential smoothing operations are performed on the second histogram of image pixel values, e.g., histogram H1, to generate a smoothed second histogram of image pixel values, e.g., smoothed H1. Operation proceeds from step 7026 to 7028.

Returning to step 7018, in step 7018 the smoothed first histogram, e.g., smoothed H2E, is truncated to the interval of pixel values of interest, e.g., truncated to [L, U]. Returning to step 7028, in step 7028 the smoothed second histogram, e.g., smoothed H1, is truncated to the interval of pixel values of interest, e.g., truncated to [L, U].

Operation proceeds from step 7018 to steps 7020, 7022, and 7023. In step 7020 minima and their properties are found in the smoothed first histogram truncated to the interval of pixel values of interest, e.g., in smoothed histogram H2E within region [L,U]. Step 7020 includes step 7021 in which a minimum is located in the smoothed first histogram truncated to the interval of pixel values of interest, e.g., a minimum is located in smoothed histogram H2E within region [L, U]. Multiple minima may be, and sometimes are, located in the smoothed first histogram in step 7020.

In step 7022 maxima and their properties are found in the smoothed first histogram truncated to the interval of interest, e.g. in smoothed histogram H2E within region [L, U]. In step 7023 points of inflection are located in the smoothed first histogram truncated to the interval of interest, e.g., in smoothed histogram H2E within region [L,U]. Step 7023 includes step 7025 in which a second derivative of the smoothed first histogram is computed, as part of locating a point of inflection in the smoothed first histogram.

Operation proceeds from step 7028 to steps 7030 and 7031. In step 7030 minima and their properties are found in the smoothed second histogram truncated to the interval of pixel values of interest, e.g., in smoothed histogram H1 within region [L,U]. Step 7030 includes step 7035 in which a minimum is located in the smoothed second histogram truncated to the interval of pixel values of interest, e.g., a minimum is located in smoothed histogram H1 within region [L, U]. Multiple minima may be, and sometimes are, located in the smoothed second histogram in step 7030.

In step 7031 points of inflection are located in the smoothed second histogram truncated to the interval of interest, e.g., in smoothed histogram H1 within region [L,U]. Step 7031 includes step 7033 in which a second derivative of the smoothed second histogram is computed, as part of locating a point of inflection in the smoothed second histogram.

Operation proceeds from steps 7020, 7022, 7023, 7030 and 7031, via connecting node A 7032, to step 7034. In step 7034, a unique minimum in the smoothed second histogram, e.g., in smoothed H1, is looked for from the analysis of minima and their properties in truncated smoothed first and second histograms, e.g., in smoothed H2E truncated to [L, U] and in smoothed H1 truncated to [L, U]. In step 7034 hidden peaks are also looked for in the truncated smoothed first and second histograms. Step 7034 includes steps 7036, 7038, 7037, 7041, 7039, and 7043.

In step 7036, a determination is made as to whether there is a single found minimum or multiple found minima or no found minimum in the second histogram, e.g., in smoothed second histogram H1 within range [L, U]. In step 7038, the location of each minimum which was found in the smoothed second histogram is determined with respect to peaks found in the smoothed first histogram, e.g., within the truncated region of interest [L, U]. In step 7037, the located points of inflection in said smoothed first histogram are examined to determine if there are hidden peaks in the smoothed first histogram. Step 7037 includes step 7041 in which locations of zero crossings of the second derivative in the smoothed first histogram are examined to determine if there are hidden peaks in the smoothed first histogram, e.g., within the truncated region of interest [L, U]. In step 7039, the located points of inflection in said smoothed second histogram are examined to determine if there are hidden peaks in the smoothed second histogram. Step 7039 includes step 7043 in which locations of zero crossings of the second derivative in the smoothed second histogram are examined to determine if there are hidden peaks in the smoothed second histogram, e.g., within the truncated region of interest [L, U].

Operation proceeds from step 7034 to step 7040. In step 7040 a decision is made to recommend use of local binarization thresholds or a global binarization threshold. The decision of step 7040 is based on the generated first histogram of edge pixel values, e.g., H2E. The decision of step 7040 is further based on the generated second histogram of image pixel values, e.g., H1. Step 7040 includes steps 7042, 7044, 7046, 7048 and 7050.

In step 7042, if a single minimum in the smoothed second histogram, e.g., in smoothed H1, was found, then operation proceeds from step 7042 to step 7044. However, if multiple minima in the smoothed second histogram were found then, operation proceeds from step 7042 to step 7048, in which use of local binarization thresholds is recommended. If no minimum in the smoothed second histogram was found then, operation proceeds from step 7042 to step 7048, in which use of local binarization thresholds is recommended. Step 7042 is based on the determination of step 7036. In some embodiments, the single minimum referred to in step 7036 and step 7042 is a single valid found minimum in the smoothed second histogram. In some such embodiments, one or more found minima in the smoothed second histogram are ignored as invalid, e.g., because they do not pass a validity acceptance test.

Returning to step 7044, in step 7044 if the location of the single minimum in the smoothed second histogram, e.g., in smoothed H1, is determined to be located between two peaks of the smoothed first histogram, e.g., between two peaks of smoothed H2E, then operation proceeds from step 7044 to step 7046; otherwise, operation proceeds from step 7044 to step 7048, in which use of local binarization thresholds is recommended. Step 7044 is based on information from step 7038.

Returning to step 7046, in step 7046, it is determined as to whether no hidden peaks were found in both the first and second smoothed histograms. If no hidden peaks were found in both the first and second smoothed histograms, e.g., in both smoothed H2E and smoothed H1, then operation proceeds from step 7046 to step 7050, in which use of a global binarization threshold is recommended. However, if a hidden peak was found in at least one of the first and second smoothed histograms, then operation proceeds from step 7046, to step 7048, in which use of local binarization thresholds is recommended. Step 7046 is based on the examinations of steps 7037 and 7039.

Operation proceeds from step 7004, via connecting node B 7052, to step 7054. In step 7054 a global threshold is used or local thresholds are used, based on the returned recommendation, to process the set of input pixel values and generate a corresponding set of bi-level values, said local thresholds including at least a first local image binarization threshold and a second local image binarization threshold. Step 7054 includes steps 7056, 7058, and 7060. In step 7056, if the recommendation is to use a global threshold, then operation proceeds from step 7056 to step 7058, in which a global image binarization threshold is used to process the set of input image pixel values to generate a corresponding set of bi-level values. However, in step 7056, if the recommendation is to use local thresholds, then operation proceeds from step 7056 to step 7060, in which a plurality of local thresholds are used to process the set of input image pixel values to generate a corresponding set of bi-level values. Step 7060 includes steps 7062 and 7064. In step 7062, a first local image binarization threshold is used to binarize a first portion of said image, e.g., a first portion of the input image to which the received set if input image pixel values correspond. Operation proceeds from step 7062 to step 7064. In step 7064, a second local image binarization threshold is used to binarize a second portion of said image, e.g., a second portion of the input image to which the received set if input image pixel values correspond, said second portion being different than said first portion. In various embodiments, the first and second portion of said image are non-overlapping portions. In some embodiments, in which local binarization thresholds are recommended and used, there are N different local binarization thresholds corresponding to N non-overlapping portions of said input image.

Operation proceeds from step 7054 to step 7066, in which an output image is generated from the set of bi-level values. Operation proceeds from step 7066 to step 7068, in which the generated output image is stored in memory. Operation proceeds from step 7068 to step 7070, in which the generated output image is displayed, printed, and/or transmitted.

Figure 17A:
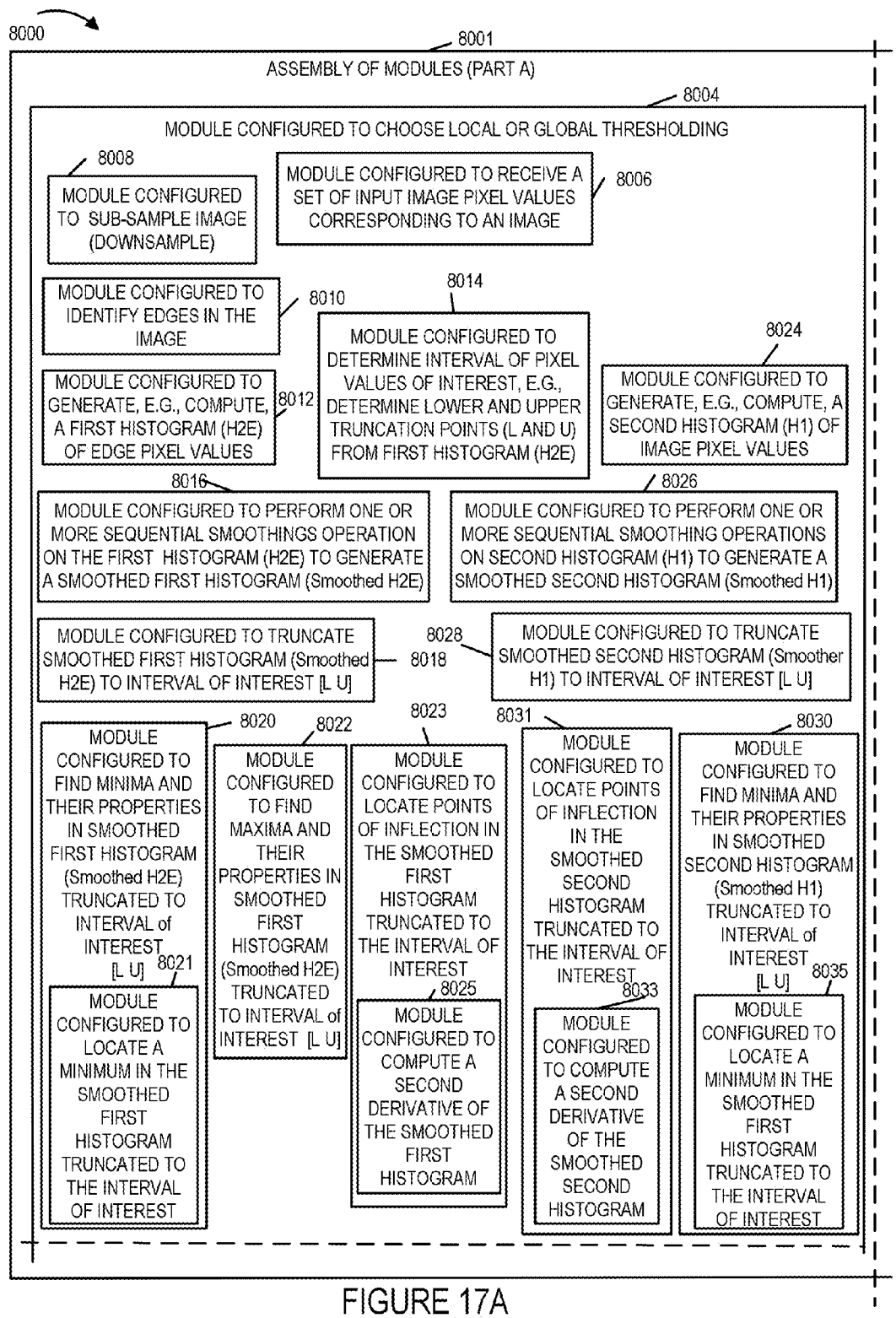
FIG. 17A is a first part of an assembly of modules which can, and in some embodiments is, used in the exemplary system illustrated in FIG. 7.
Figure 17B:
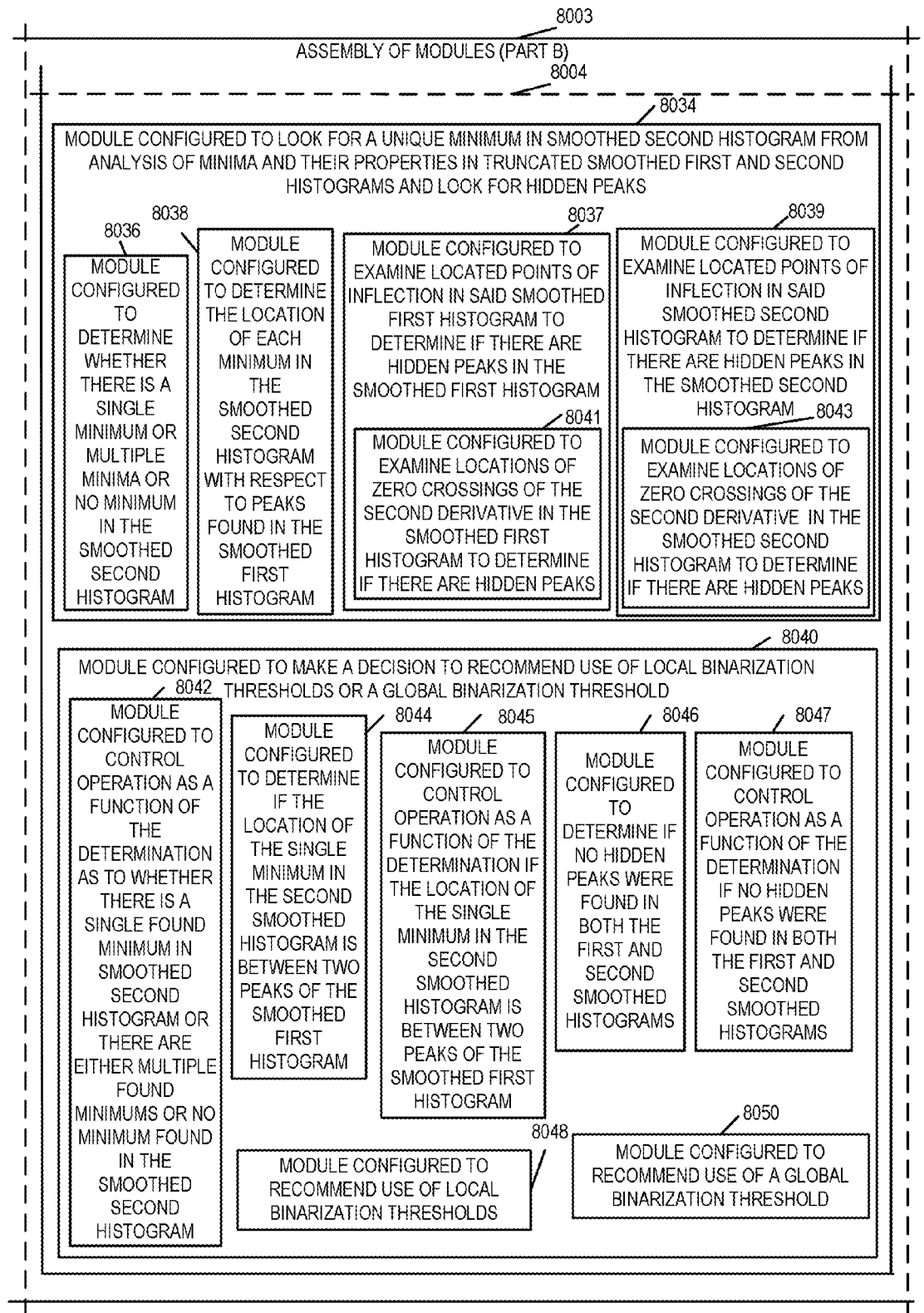
FIG. 17B is a second part of an assembly of modules which can, and in some embodiments is, used in the exemplary system illustrated in FIG. 7.
Figures 17, 17C:
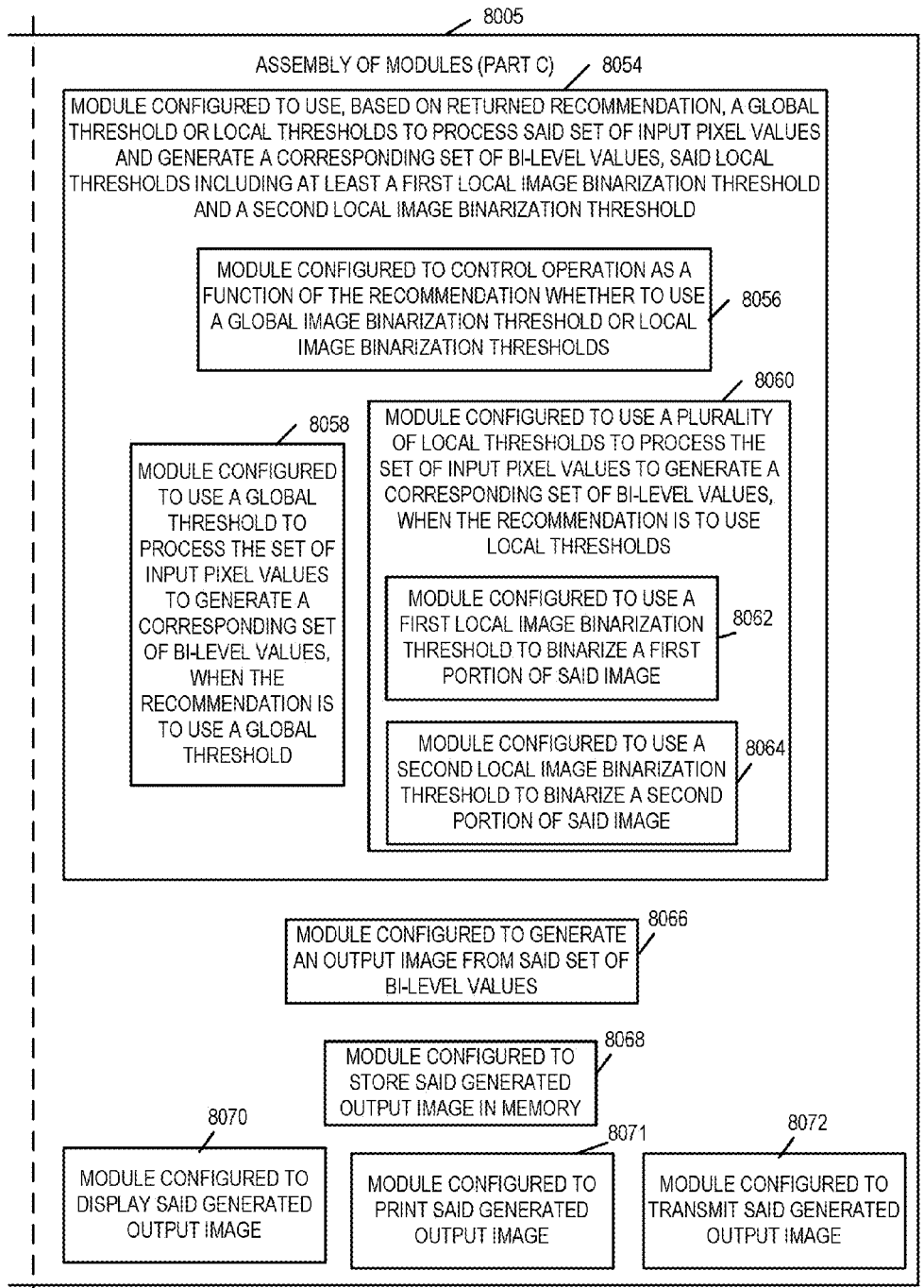
FIG. 17C is a third part of an assembly of modules which can, and in some embodiments is, used in the exemplary system illustrated in FIG. 7.
FIG. 17 comprises the combination of FIG. 17A, FIG. 17B and FIG. 17C.

FIG. 17, comprising the combination of FIG. 17A, FIG. 17B and FIG. 17C, illustrates an assembly of modules 8000, comprising Part A 8001, Part B 8003, and Part C 8005, in accordance with an exemplary embodiment. Assembly of modules 8000 can, and in some embodiments is, used in the exemplary system 900 illustrated in FIG. 7, e.g., as assembly of modules 918. Assembly of modules 8000 can be implemented in hardware within the processor 908 of the system 900, e.g., as individual circuits. The modules in the assembly 8000 can, and in some embodiments are, implemented fully in hardware within the processor 908, e.g., as individual circuits. In other embodiments some of the modules are implemented, e.g., as circuits, within the processor 908 with other modules being implemented, e.g., as circuits, external to and coupled to the processor. As should be appreciated the level of integration of modules on the processor and/or with some modules being external to the processor may be one of design choice.

Alternatively, rather than being implemented as circuits, all or some of the modules in assembly of modules 8000 may be implemented in software and stored in the memory 912 of the system 900 with the modules controlling operation of system 900 to implement the functions corresponding to the modules when the modules are executed by a processor, e.g., processor 908. In some such embodiments, the assembly of modules 8000 is included in the memory 912. In still other embodiments, various modules are implemented as a combination of hardware and software, e.g., with another circuit external to the processor providing input to the processor 908 which then under software control operates to perform a portion of a module's function. While shown in the FIG. 7 embodiment as a single processor, e.g., computer, it should be appreciated that the processor 908 may be implemented as one or more processors, e.g., computers.

When implemented in software the modules include code, which when executed by the processor 908, configure the processor 908 to implement the function corresponding to the module. In embodiments where the assembly of modules 8000 is stored in the memory 912, the memory 912 is a computer program product comprising a computer readable medium comprising code, e.g., individual code for each module, for causing at least one computer, e.g., processor 908, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 17 control and/or configure the system 900 or elements therein such as the processor 908, to perform the functions of the corresponding steps illustrated in the method flowchart 7000 of FIG. 16. Thus the assembly of modules 8000 includes various modules that perform functions of the corresponding steps of the method shown in FIG. 16.

Assembly of modules 8000 includes a module 8004 configured to choose local or global thresholding, a module 8054 configured to use, based on a returned recommendation, a global threshold or local thresholds to process said set of input pixel values and generated a corresponding set of bi-level values, said local thresholds including at least a first local image binarization threshold and a second local image binarization threshold, said first local image binarization threshold being different from said second local image binarization threshold, a module 8066 configured to generate an output image from said set of bi-level values, a module 8068 configured to store said generated output image in memory, a module 8070 configured to display said generated output image, a module 8071 configured to print said generated output image, and a module 8072 configured to transmit said generated output image.

Module 8004 includes a module 8006 configured to receive a set of input image pixel values corresponding to an image, e.g., a set of grayscale input image pixel values corresponding to an image, a module 8008 configured to sub-sample the image, e.g., downsample by two or another factor, a module 8010 configured to identify edges in the image, said edges including edge pixel values, a module 8012 configured to generate, e.g., compute, a first histogram of edge pixel values, e.g., histogram H2E, and a module 8014 configured to determine an interval of pixel values of interest based on the generated first histogram, e.g. determine lower and upper truncation points (L and U) from the first histogram. Module 8004 further includes a module 8016 configured to perform one or more sequential smoothing operations on the first histogram of edge pixel values, e.g., H2E, to generate a smoothed first histogram of edge pixel values, e.g., smoothed H2E, and a module 8018 configured to truncate the smoothed first histogram to the interval of pixel values of interest, e.g., truncate smoothed H2E to range [L,U].

Module 8004 further includes a module 8024 configured to generate, e.g., compute, a second histogram of image pixel values, e.g., histogram H1, a module 8026 configured to perform one or more sequential smoothing operations on the second histogram of image pixel values, e.g., H1, to generate a smoothed second histogram of image pixel values, e.g., smoothed H1, and a module 8028 configured to truncate the smoothed second histogram to the interval of pixel values of interest, e.g., truncate smoothed H1 to range [L,U].

Module 8004 further includes a module 8020 configured to find minima and their properties in the smoothed first histogram truncated to the interval of pixel values of interest, e.g., smoothed H2E truncated to interval [L,U], a module 8022 configured to find maxima and their properties in the smoothed first histogram truncated to the interval of pixel values interest, e.g., smoothed H2E truncated to interval [L,U], a module 8023 configured to locate points of inflection in the smoothed first histogram truncated to the interval of pixel values of interest, e.g., smoothed H2E truncated to interval [L,U], a module 8030 configured to find minima and their properties in the smoothed second histogram truncated to the interval of pixel values of interest, e.g., smoothed H1 truncated to interval [L,U], a module 8031 configured to locate points of inflection in the smoothed second histogram truncated to the interval of interest, e.g., smoothed H1 truncated to interval [L,U], a module 8034 configured to look for a unique minimum in the smoothed second histogram, e.g., smoothed H1, from analysis of minima and their properties in the truncated smoothed first and second histograms, e.g., smoothed H2E and smoothed H1 truncated to interval [L,U], and to look for hidden peaks, and a module 8040 configured to make a decision to recommend use of local image binarization thresholds or a global image binarization threshold.

Module 8020 includes a module 8021 configured to locate a minimum in the smoothed first histogram truncated to the interval of pixel values of interest, e.g., locate a minimum in smoothed H2E truncated to interval [L,U].

Module 8023 includes a module 8025 configured to compute a second derivative of the smoothed first histogram. Module 8031 includes a module 8033 configured to compute a second derivative of the smoothed second histogram.

Module 8030 includes a module 8035 configured to locate a minimum in the smoothed second histogram truncated to the interval of pixel values of interest, e.g., locate a minimum in smoothed H1 truncated to interval [L,U].

Module 8034 includes a module 8036 configured to determine whether there is a single found minimum or either multiple found minima or no found minimum in the smoothed second histogram, e.g., in smoothed H1, a module 8038 configured to determine the location of each found minimum in the smoothed second histogram with respect to peaks found in the smoothed first histogram, a module 8037 configured to examine located points of inflection in said smoothed first histogram to determine if there are hidden peaks in the smoothed first histogram, and a module 8039 configured to examine located points of inflection in said smoothed second histogram to determine if there are hidden peaks in the smoothed second histogram. Module 8037 includes a module 8041 configured to examine locations of zero crossings of the second derivative in the smoothed first histogram to determined if there are hidden peaks, e.g., in the smoothed H2E in the range [L, U]. Module 8039 includes a module 8043 configured to examine locations of zero crossings of the second derivative in the smoothed second histogram to determined if there are hidden peaks, e.g., in the smoothed H1 in the range [L, U].

Module 8040 includes a module 8042 configured to control operation as a function of the determination as to whether there is a single found minimum in the smoothed second histogram or either multiple found minimums or no found minimum in the smoothed second histogram, a module 8044 configured to determine if the location of the single minimum in the second smoothed histogram is between two peaks of the smoothed first histogram, a module 8045 configured to control operation as a function of the determination if the location of the single minimum in the second smoothed histogram is between two peaks of the smoothed first histogram, a module 8046 configured to determine if no hidden peaks were found in both the first and second smoothed histograms, a module 8047 configured to control operation as a function of the determination if no hidden peaks were found in both the first and second smoothed histograms, a module 8048 configured to recommend use of local binarization thresholds, and a module 8050 configured to recommend use of a global binarization threshold.

In various embodiments, module 8048 is configured to recommend use of local binarization thresholds when more than one minimum is found in said smoothed second histogram. In various embodiments, module 8048 is configured to recommend use of local binarization thresholds when no minimum is found in said smoothed second histogram. In various embodiments, module 8048 is configured to recommend use of local binarization thresholds when the location of the single minimum found in said smoothed second histogram is not between two found peaks in the smoothed first histogram. In various embodiments, module 8048 is configured to recommend use of local binarization thresholds when a hidden peak is found in said smoothed first histogram. In various embodiments, module 8048 is configured to recommend use of local binarization thresholds when a hidden peak is found in said smoothed second histogram. In various embodiments, module 8050 is configured to recommend to use a use a global binarization threshold when a single minimum is found in the second smoothed histogram, the single found minimum in the second smoothed histogram is between two found peaks, e.g., found maxima, of the first smoothed histogram, and no hidden peaks were found in both the first and second smoothed histograms.

Module 8054 includes a module 8056 configured to control operation as a function of the recommendation whether or not to use a global image binarization threshold or local image binarization thresholds, a module 8058 configured to use a global image binarization threshold to process the set of input image pixel values to generate a corresponding set of bi-level values when the recommendation is to use a global binarization threshold, and a module 8060 configured to use a plurality of local image binarization thresholds to process the set of input image pixel values to generate a corresponding set of bi-level values, when the recommendation is to use local binarization thresholds. Module 8060 includes a module 8062 configured to use a first local image binarization threshold to binarize a first portion of said image and a module 8064 configured to use a second local image binarization threshold to binarize a second portion of said image. In various embodiments, the first and second portions are non-overlappings and the first and second local image binarization thresholds are different.

The techniques of various embodiments may be implemented using software, hardware and/or a combination of software and hardware. Various embodiments are directed to apparatus, e.g., an image processing device or system. Various embodiments are also directed to methods, e.g., a method of generating bi-level pixel values from a set of input pixel values corresponding to an image. Various embodiments are also directed to machine, e.g., computer, readable medium, e.g., ROM, RAM, CDs, hard discs, etc., which include machine readable instructions for controlling a machine to implement one or more steps of a method.

In various embodiments apparatus described herein are implemented using one or more modules to perform the steps corresponding to one or more methods. Thus, in some embodiments various features are implemented using modules. Such modules may be implemented using software, hardware or a combination of software and hardware. In some embodiments in which the modules are implemented in hardware, the modules are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software. Numerous additional variations on the methods and apparatus of the various embodiments described above will be apparent to those skilled in the art in view of the above description. Such variations are to be considered within the scope of the invention.

What is claimed is:

1. An image binarization method, the method comprising:
   identifying edges in an image, said edges including edge pixel values;
   generating a histogram (H2E) of edge pixel values corresponding to the identified edges; and
   generating, based on the generated histogram (H2E) of edge pixel values, a statistically based binarization threshold, generating the statistically based binarization threshold including:
   i) determining from the histogram (H2E) of edge pixel values pixel value truncation points L and U; and
   ii) generating the statistically based binarization threshold from pixel values in said image which are within a range of pixel values extending between L and U while excluding from use values outside said range;
   performing one or more sequential smoothing operations on a histogram (H1) of image pixel values to produce a smoothed image histogram of image pixel values;
   performing one or more sequential smoothing operations on said histogram (H2E) of edge pixel values to produce a smoothed edge histogram of edge pixel values; and
   setting an image binarization threshold to the generated statistically based binarization threshold or a threshold generated from the histogram (H1) of image pixel values, said setting an image binarization threshold including deciding which one of the generated statistically based binarization threshold or the threshold generated from the histogram (H1) of image pixel values to use as the image binarization threshold based at least in part on the smoothed image histogram of image pixel values and the smoothed edge histogram of edge pixel values.

2. The method of claim 1, wherein at least some of said pixel values in said range are non-edge pixel values.

3. The method of claim 2 wherein generating the statistically based binarization threshold further includes using a clustering algorithm applied to the pixel values in said range.

4. The method of claim 1, further comprising:
   determining based on the histogram H2E of edge pixel values, an interval of pixel values of interest, said interval of pixel values of interest extending between a minimum pixel value of interest and a maximum pixel value of interest.

5. The method of claim 4, wherein said interval of pixel values of interest includes a predetermined percentage of edge pixel values.

6. The method of claim 1, further comprising:
   computing a first derivative of said smoothed edge histogram of edge pixel values; and determining histogram values corresponding to zero crossings of said first derivative of said smoothed edge histogram of edge pixel values.

7. The method of claim 1, wherein performing one or more sequential smoothing operations on said histogram (H1) of image pixel values includes:
computing a first derivative of said smoothed image histogram of image pixel values; and
determining histogram values corresponding to zero crossings of said first derivative of said smoothed image histogram of image pixel values.

8. The method of claim 7, further comprising:
limiting zero crossing information used to generate said statistically based binarization threshold to zero crossings which correspond to pixel values in the range of pixel values extending between L and U; and
set the threshold generated from the histogram (H1) of image pixel values to the location of the minimum in said smoothed image histogram.

9. The method of claim 1, wherein said step of generating a statistically based binarization threshold is further based on pixel values of non-edge image areas as well as said edge pixel values.

10. The method of claim 1, wherein identifying edges in the image includes:
generating a contrast value for each pixel value in the image; and
identifying as edge pixel values, pixel values which exceed a contrast threshold.

11. The method of claim 10, wherein the contrast value of a pixel is a function of the value of the pixel and values of pixels in a neighborhood surrounding said pixel.

12. The method of claim 10, wherein said contrast threshold is determined based on a plurality of contrast values corresponding to pixel values of said image.

13. The method of claim 12, wherein said contrast threshold is generated from a histogram of said contrast values.

14. The method of claim 13, wherein said contrast threshold is generated using an OTSU algorithm on the histogram of contrast values to produce said contrast threshold.

15. A non-transitory computer readable medium including processor executable instructions which when executed by a processor control said processor to:
identify edges in an image, said edges including edge pixel values;
generate a histogram (H2E) of edge pixel values corresponding to the identified edges;
generate, based on the histogram (H2E) of edge pixel values, a statistically based binarization threshold, as part of generating the statistically based binarization threshold, control the processor to:
i) determine from the histogram (H2E) of edge pixel values pixel value truncation points L and U; and
ii) generate the statistically based binarization threshold from pixel values in said image which are within a range of pixel values extending between L and U while excluding from use values outside said range;
perform one or more sequential smoothing operations on a histogram (H1) of image pixel values to produce a smoothed image histogram of image pixel values;
perform one or more sequential smoothing operations on said histogram (H2E) of edge pixel values to produce a smoothed edge histogram of edge pixel values; and
set an image binarization threshold to the generated statistically based binarization threshold or a threshold generated from the histogram (H1) of image pixel values, said setting the image binarization threshold including deciding which one of the generated statistically based binarization threshold or the threshold generated from the histogram (H1) of image pixel values to use as the image binarization threshold based at least in part on the smoothed image histogram of image pixel values and the smoothed edge histogram of edge pixel values.

16. An apparatus for performing image binarization, the apparatus comprising:
a memory including an image to be binarized; and
a processor configured to:
identify edges in the image, said edges including edge pixel values;
generate a histogram (H2E) of edge pixel values corresponding to the identified edges;
generate, based on the histogram (H2E) of edge pixel values, a statistically based binarization threshold, as part of being configured to generate the statistically based binarization threshold said processor being further configured to:
i) determine from the histogram (H2E) of edge pixel values pixel value truncation points L and U; and
ii) generate the statistically based binarization threshold from pixel values in said image which are within a range of pixel values extending between L and U while excluding from use values outside said range;
perform one or more sequential smoothing operations on a histogram (H1) of image pixel values to produce a smoothed image histogram of image pixel values;
perform one or more sequential smoothing operations on said histogram (H2E) of edge pixel values to produce a smoothed edge histogram of edge pixel values; and
set an image binarization threshold to the generated statistically based binarization threshold or a threshold generated from the histogram (H1) of image pixel values, said setting the image binarization threshold including deciding which one of the generated statistically based binarization threshold or the threshold generated from the histogram (H1) of image pixel values to use as the image binarization threshold based at least in part on the smoothed image histogram of image pixel values and the smoothed edge histogram of edge pixel values.

17. The apparatus of claim 16, wherein said processor is further configured to:
perform a binarization operation on said image using said set image binarization threshold to generate a binarized image; and
transmit said binarized image or output said binarized image to a display.

* * * * *